US007006484B2

(12) United States Patent
Hayama et al.

(10) Patent No.: US 7,006,484 B2
(45) Date of Patent: Feb. 28, 2006

(54) BASE STATION APPARATUS, MOBILE STATION, AND CONTENTS PROVIDER

(75) Inventors: Masao Hayama, Yokohama (JP);
Yoshiyuki Machida, Kawasaki (JP);
Shirou Mazawa, Fujisawa (JP);
Fumihiko Shimazaki, Yokohama (JP);
Yuichiro Katsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 923 days.

(21) Appl. No.: 09/899,263

(22) Filed: Jul. 6, 2001

(65) Prior Publication Data

US 2002/0003787 A1 Jan. 10, 2002

(30) Foreign Application Priority Data

Jul. 7, 2000 (JP) ............................. 2000-211985

(51) Int. Cl.
*H04J 13/00* (2006.01)
(52) U.S. Cl. ..................................... 370/342; 725/118
(58) Field of Classification Search ............... 370/342, 370/441; 725/118, 119
See application file for complete search history.

(56) References Cited

U.S. PATENT DOCUMENTS

| 5,148,272 | A | | 9/1992 | Acampora et al. |
| 5,654,747 | A | | 8/1997 | Ottesen et al. |
| 6,014,694 | A | | 1/2000 | Aharoni et al. |
| 2004/0083495 | A1 | * | 4/2004 | Lane et al. ................. 725/127 |

FOREIGN PATENT DOCUMENTS

| EP | 0721258 | 7/1996 |
| EP | 0785686 | 7/1997 |
| EP | 0869650 | 10/1998 |
| EP | 0954178 | 11/1999 |
| EP | 0986282 | 3/2000 |

OTHER PUBLICATIONS

Yun et al "Power Control for Variable QOS on a CDMA Channel", Military Communications Conference, 1994, Milcom '94 IEEE Fort Monmouth, NJ Oct. 2-5, 1994, pp. 178-182.
Gadkari et al, "Unequally Protected Multi-State Vector Quantization for Time-Varying Channels", Communications 1998, Conference Record 1998, IEEE International Conference on Atlanta, Jun. 7-11, pp. 786-790.
P. Hoeher "Unequal Error Protection for Digital Mobile DS-CDMA Radio Systems", 1994 ICC Supercomm/ICC, Conference Record, Serving Humanity Through Communications IEEE International, May 1-5, 1994, pp. 1236-1241.
R. Koenen, "MPEG-4 Overview" ISO/IEC JTC1/SC29/WG11 N1909 MPEG97, Oct. 1997, pp. 1-43.

* cited by examiner

*Primary Examiner*—Melvin Marcelo
(74) *Attorney, Agent, or Firm*—Mattingly, Stanger, Malur & Brundidge, P.C.

(57) ABSTRACT

A radio communication system arranged to deliver multimedia information into a plurality of mobile stations is arranged to deliver the multimedia information according to the wave circumstances of each mobile station, layer the information components composing the multimedia information, create the frame containing the layered information components and the transmission priorities of the components, connect the frames on a multimedia information unit, and then transmit the connected frames to a base station.

13 Claims, 18 Drawing Sheets

FIG.4
310
| 1 | 2 | 3 | 4 |
|---|---|---|---|
| 5 | 6 | 7 | 8 |
| 9 | 10 | 11 | 12 |
| 13 | 14 | 15 | 16 |
ORIGINAL STILL PICTURE
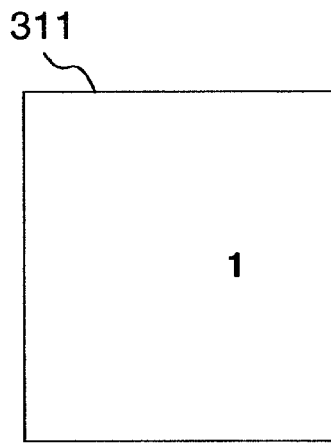
LAYER 1 INFORMATION
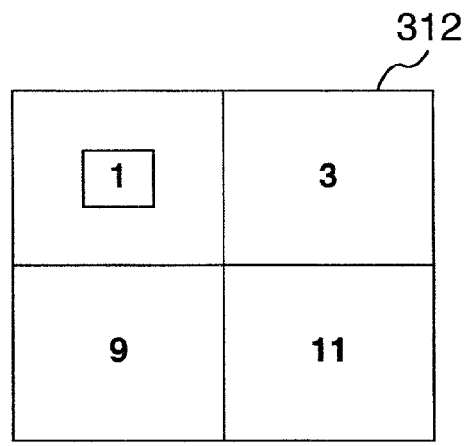
LAYER 2 INFORMATION
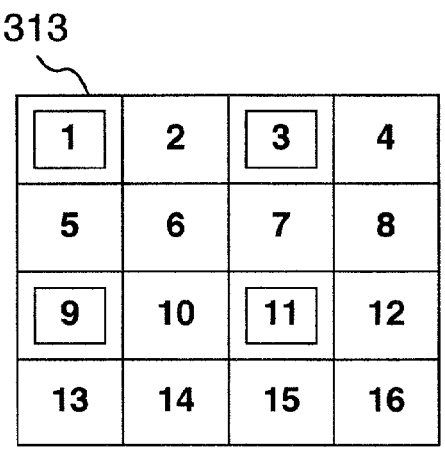
LAYER 3 INFORMATION

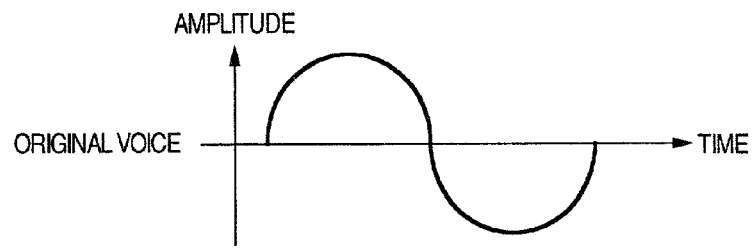
FIG.5A ORIGINAL VOICE
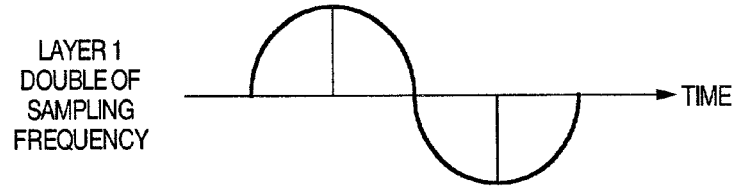
FIG.5B LAYER 1 DOUBLE OF SAMPLING FREQUENCY
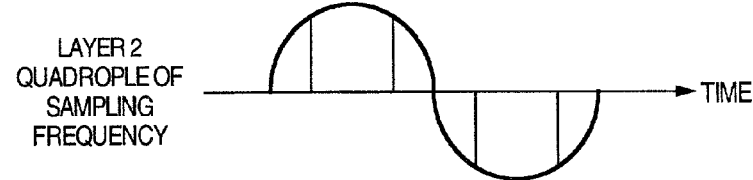
FIG.5C LAYER 2 QUADROPLE OF SAMPLING FREQUENCY
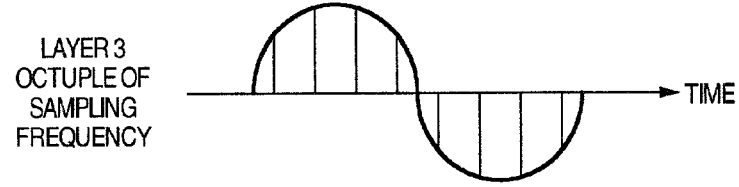
FIG.5D LAYER 3 OCTUPLE OF SAMPLING FREQUENCY
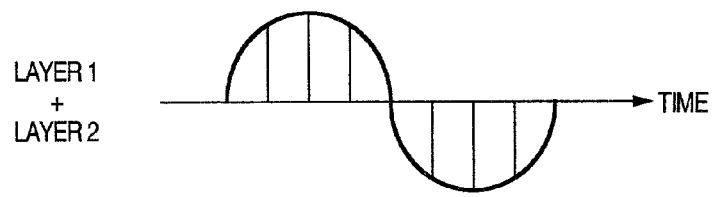
FIG.5E LAYER 1 + LAYER 2
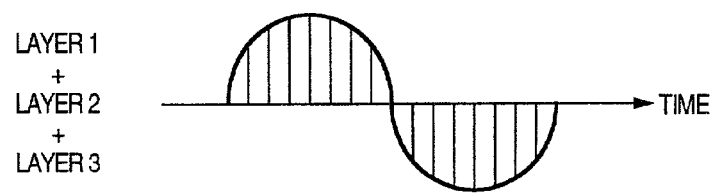
FIG.5F LAYER 1 + LAYER 2 + LAYER 3

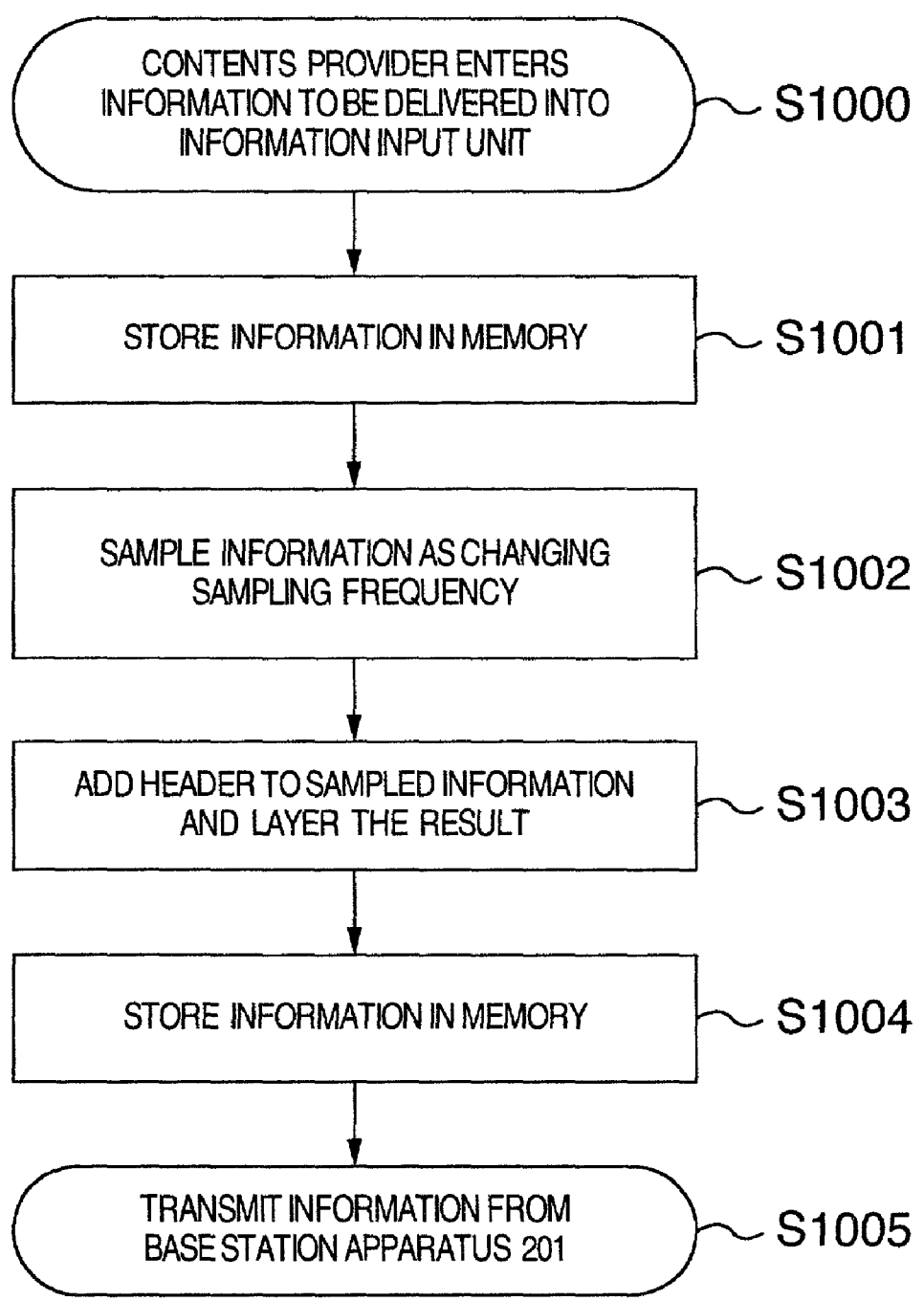

ORIGINAL PICTURE

ONLY LAYER 1 RECEIVED

LAYERS 1 AND 2 RECEIVED

THREE LAYERS RECEIVED

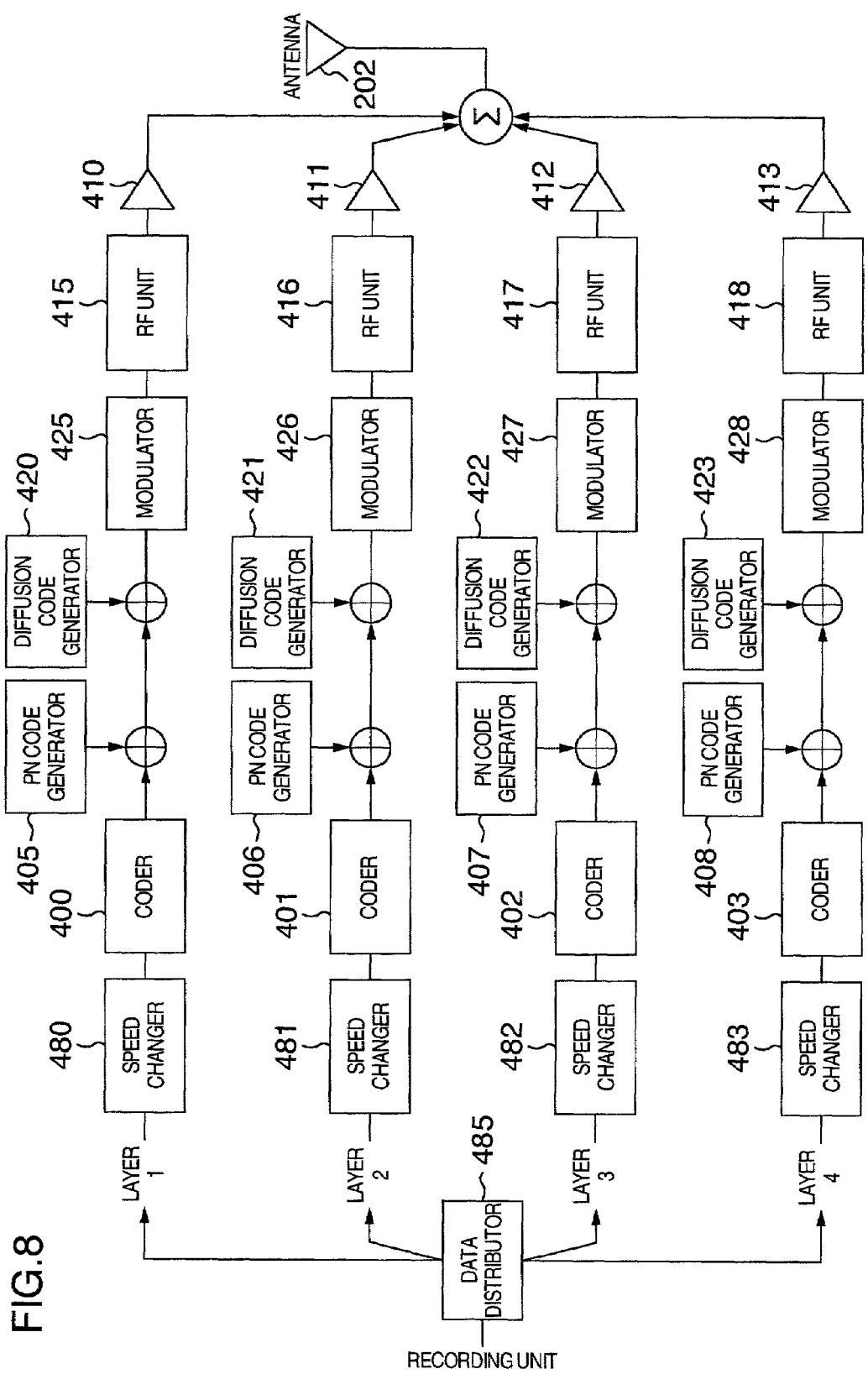

FIG.13A

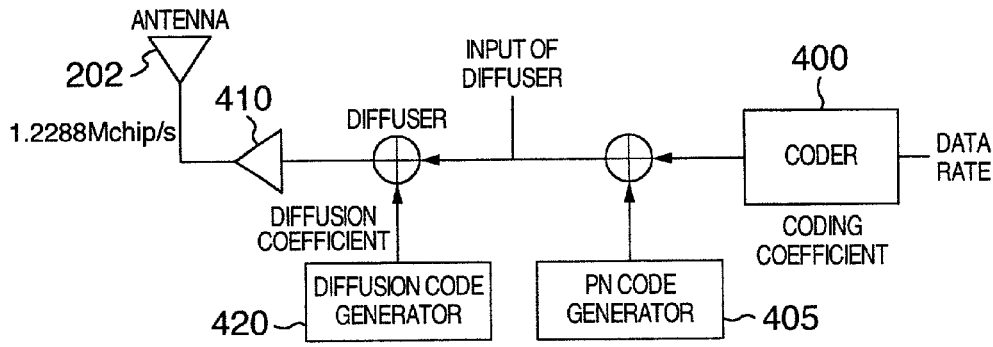

FIG.13B

DATA RATE

| No. | DATA RATE | ANTENNA | DIFFUSION COEFFICIENT | INPUT OF DIFFUSER | CODING COEFFICIENT |
|---|---|---|---|---|---|
| 1 | 9.6kbit/s | 1.2288Mchip/s | 64 | 19.2kbit/s | 2 |
| 2 | 19.2kbit/s | 1.2288Mchip/s | 32 | 38.4kbit/s | 2 |
| 3 | 38.4kbit/s | 1.2288Mchip/s | 16 | 76.8kbit/s | 2 |
| 4 | 76.8kbit/s | 1.2288Mchip/s | 8 | 153.6kbit/s | 2 |

FIG.13C

CODING COEFFICIENT

| No. | DATA RATE | ANTENNA | DIFFUSION COEFFICIENT | INPUT OF DIFFUSER | CODING COEFFICIENT |
|---|---|---|---|---|---|
| 1 | 9.6kbit/s | 1.2288Mchip/s | 64 | 19.2kbit/s | 2 |
| 2 | 9.6kbit/s | 1.2288Mchip/s | 32 | 38.4kbit/s | 4 |
| 3 | 9.6kbit/s | 1.2288Mchip/s | 16 | 76.8kbit/s | 8 |

FIG.13D

TRANSMISSION TIME

| No. | DATA RATE | ANTENNA | DIFFUSION COEFFICIENT | INPUT OF DIFFUSER | CODING COEFFICIENT |
|---|---|---|---|---|---|
| 1 | 9.6kbit/s | 1.2288Mchip/s | 64 | 19.2kbit/s | 2 |
| 2 | 19.2kbit/s (TIME RATE = 1/2) | 1.2288Mchip/s | 32 | 38.4kbit/s | 2 |

STILL PICTURE

| LAYER 1 | 1 | 2 | 3 | 4 | 5 | 6 | 7 | 8 | 9 | 10 | 11 | 12 | 13 | 14 | 15 | 16 |
| --- | --- | --- | --- | --- | --- | --- | --- | --- | --- | --- | --- | --- | --- | --- | --- | --- |
| LAYER 2 | 9 | 10 | 11 | 12 | 13 | 14 | 15 | 16 | 1 | 2 | 3 | 4 | 5 | 6 | 7 | 8 |
| LAYER 3 | 5 | 6 | 7 | 8 | 9 | 10 | 11 | 12 | 13 | 14 | 15 | 16 | 1 | 2 | 3 | 4 |
| LAYER 4 | 13 | 14 | 15 | 16 | 1 | 2 | 3 | 4 | 5 | 6 | 7 | 8 | 9 | 10 | 11 | 12 |

→ TIME

ONLY TEXT RECEIVED

TEXT AND STILL PICTURE RECEIVED AT A TIME

TEXT AND MOVING PICTURE RECEIVED AT A TIME

BASE STATION APPARATUS, MOBILE STATION, AND CONTENTS PROVIDER

BACKGROUND OF THE INVENTION

The present invention relates to an information delivery system for delivering multimedia information through the use of the radio technology.

The IS-95 radio system that is currently used in Japan and the IMT-2000 that will be used in near future employ the CDMA technology, in which one mobile station enables to receive two or more traffic channels on the same frequency band at a time. For example, the IS-95 radio system makes it possible to simultaneously receive five traffic channels each having a transmission speed of 14.4 Kb/s, thereby leading to the communication at a transmission speed of 72 Kb/s.

The reception of plural traffic channels on one mobile station at a time is made possible in the case that the mobile station is located in the so-called excellent wave circumstances, that is, the wave circumstances that the signal power is high but the noise power is low. That is, in this type of radio communication system, one mobile station has so fast a transmission speed that it may receive plural radio channels, while another mobile station has so slow a transmission speed that it may receive only one radio channel. The base station apparatus disables to control the transmission power for each mobile station. Hence, in such a radio communication system that the transmission speed of the wireless interval may be changed according to the wave circumstances such as the signal power and the noise power, in a case that the same information is multicast or broadcast to a plurality of mobile stations, it is necessary to suit the information delivery to the mobile station having the slowest transmission speed of the associated mobile stations. For this purpose, the base station apparatus has to maximize the transmission power so that the information may be positively delivered to all the mobile stations. However, the maximization of the transmission power of the mobile station apparatus brings about any interference to be given to another radio channel within the same frequency band, which radio channel may be often used for speech or another information delivery.

It is an object of the present invention to provide an information delivery system which may vary an information amount and the quality of service received by the use according to the radio circumstances of the mobile station as considering any interference to be given to another communication in the multicast or broadcast information delivery in which the same information is delivered to all users. That is, the information delivery system may be designed so that the mobile station under the bad wave circumstances enables to deliver the information with the highest priority to be inevitably delivered, while the mobile station under the good wave circumstances enables to receive the information with the higher priority and the additional information.

SUMMARY OF THE INVENTION

The present invention is made to solve the foregoing problem. The object of the invention is to deliver the multimedia information according to the radio circumstances for each mobile station.

In carrying out the object, according to an aspect of the invention, the base station apparatus is a base station that is arranged to deliver multimedia information to plural mobile stations through the radio channels connected in a CDMA (Code Division Multiple Access) system. The base station apparatus includes a receive interface for receiving a frame of each layered information component with its transmission priority, an allocating device for allocating the frame received on the receive interface to a proper channel according to the transmission priority, that is, allocating the frame with a higher transmission priority to the channel with better communication quality in which some factors such as a transmission power and a diffusion ratio are adjusted so that a frame error may be reduced, a diffuser for diffusing the frame allocated by the allocating device and provided in each channel, and a transmitter for transmitting the frame diffused by the diffuser.

According to another aspect of the invention, the contents provider system is arranged to deliver the multimedia information to plural mobile stations through plural base station apparatuses. The contents provider system includes a layering unit for layering the information components of the multimedia information, a frame creating unit for creating a frame of each layered information component with its transmission priority, and a transmitter for connecting plural frames created by the frame creating unit at a multimedia information unit and transmitting the connected frames to the base station apparatus.

According to another aspect of the invention, the mobile station is arranged to receive the multimedia information from the base station apparatus through the radio channel connected in the CDMA system. The mobile station includes a receive interface for layering the information components of the multimedia information and receiving frames each containing each layered information component, a reverse diffuser provided for each channel and for reversely diffusing the frames received on the receive interface through the diffuse codes for separating the channel notified from the base station apparatus and thereby picking up the frame allocated to the channel, a determining unit provided for each channel and for determining if the frame picked by the reverse diffuser meets the predetermined communication quality level, a recomposing unit for recomposing the multimedia information from the frames determined to meet the predetermined communication quality level, and an information output unit for outputting the multimedia information recomposed by the recomposing unit to the output unit.

According to another aspect of the invention, the accounting method is arranged to charge fees to plural mobile stations to which the multimedia information is to be delivered. The accounting method includes the steps of recording in a first recording unit the opening information for indicating if each mobile station opened each information component of the multimedia information, recording in a second recording unit a user ID for specifying each mobile station when the opening information of each mobile station recorded in the first recording unit indicates that it is opened, and specifying each mobile station on the basis of the user ID recorded in the second recording unit and performing the accounting for each mobile station through the use of the operating unit.

BRIEF DESCRIPTION OF THE DRAWINGS

Preferred embodiments of the present invention will now be described in conjunction with the accompanying drawings, in which

FIG. 4 is a view showing a layer arrangement provided in the case that the delivery information is a still picture;

FIGS. 5A to 5F are views showing layer arrangements provided in the case that the delivery information is voice;

FIG. 6 is a flowchart showing a procedure of layering voice and music;

FIG. 8 is a block diagram showing a transmitter circuit located in a base station apparatus;

FIGS. 13A to 13D are views showing data rates, diffusion coefficients, coding coefficients, and time ratios differentiated according to each layer;

DESCRIPTION OF THE EMBODIMENTS

Later, the embodiment of the invention will be described with reference to the appended drawings.

Figure 1:
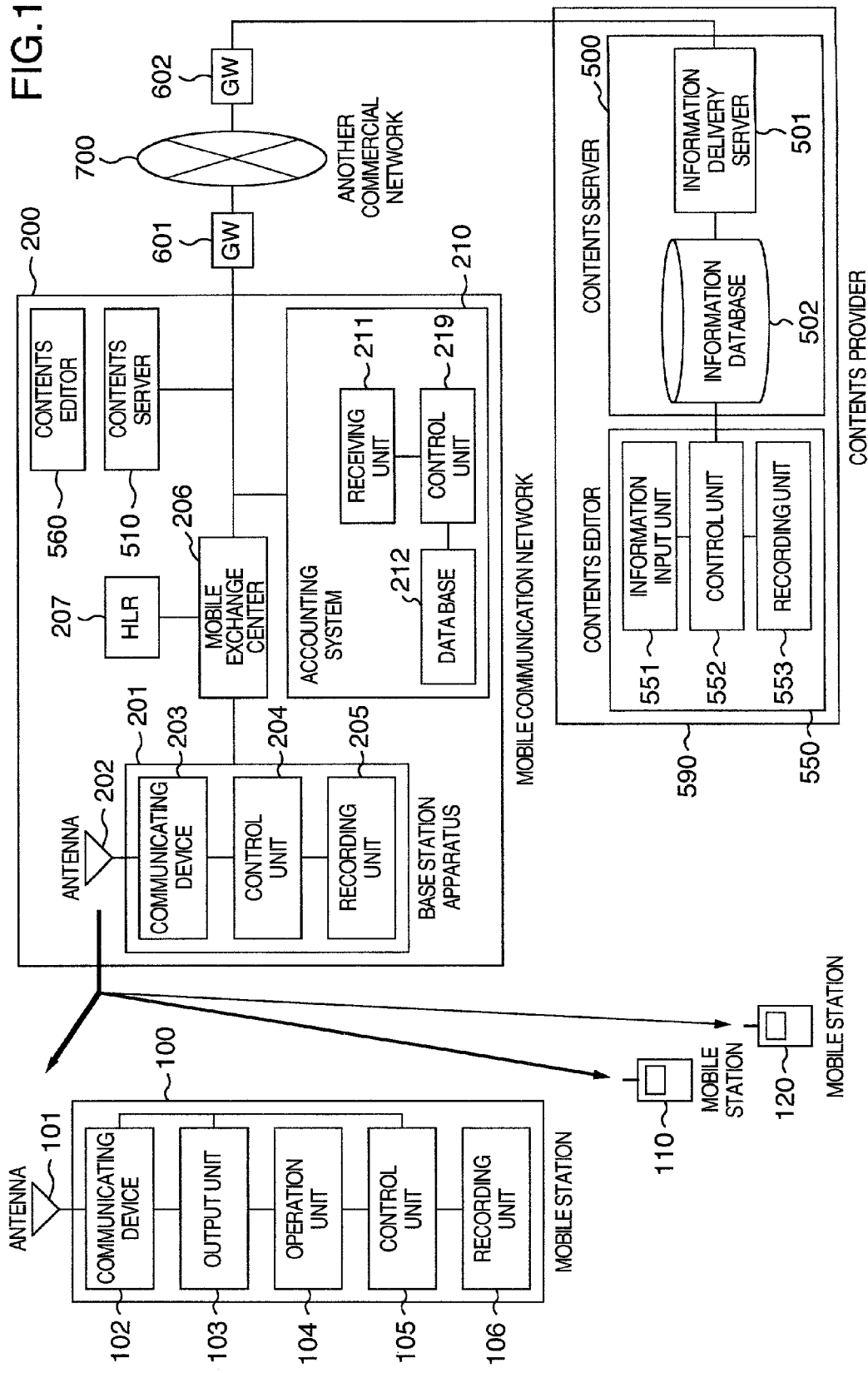
FIG. 1 is a block diagram showing a configuration of an information delivery system.

FIG. 1 shows an arrangement of an information delivery system according to an embodiment of the invention. A reference number 590 denotes a contents provider. A reference number 550 denotes a contents editor. The contents editor 550 of the contents provider 590 has a function of layering the multimedia information such as text, voice and pictures. The contents editor 550 is arranged to have a control unit 552 for layering the inputted information according to the priority of the information content, and a recording unit 553 for temporarily storing the inputted information for assigning a priority to the inputted information and layering the same.

The contents server 500 is arranged to have an information database 502 for storing the layered multimedia information from the contents editor 550 and an information delivery server 501 for delivering the information of the information database 502 to a base station apparatus 201. This contents server 500 is connected to a gateway 602 for converting a protocol for the purpose of connecting with a different network. This gateway 602 is connected to another commercial network 700 including the internet The commercial network 700 is connected to a mobile station network 200 through the gateway 601. The mobile station network 200 is arranged to have a home location register (HLR) 207 for managing location informations of a mobile station 100, another mobile station 110 and another mobile station 120, a mobile exchange center 206 for exchanging the lines on the basis of the location informations sent from the HLR 207, an accounting system 210 for charging each user for his or her consumed information, and a base station apparatus 201 for wirelessly transmitting the information from the contents server 500 to the mobile stations 100, 110 and 120 connected to the mobile exchange center 206.

The base station apparatus 201 is arranged to have a recording unit 205 having a program for controlling the base station apparatus 201 and for accumulating the pieces of information received from the contents server 500, a control unit 204 for controlling various kinds of units located inside of the base station apparatus 201, a communicating unit 204 for receiving the informations accumulated in the recording unit 205 and converting them into the radio signal, and an antenna 202 for converting the electric signal sent as an electric wave from the communicating unit. The contents server 500 and the contents editor 550 provided in the contents provider 590 may be installed inside of the mobile station network 200 as indicated as the contents server 510 and the contents editor 550 in FIG. 1. In the following embodiment, the contents server 510 has the same function as the contents server 500 and the contents editor 560 has the same function as the contents editor 550.

The base station apparatus 201 serves to deliver the information from the contents server 500 to the mobile stations 100, 110 and 120 through the radio network arranged in the CDMA system. The mobile station 100 includes an antenna 101 for converting the electric wave transmitted from the mobile station 201 into an electric signal, a communicating unit 102 for demodulating the electric signal from the antenna 101, an output unit 103 for outputting the received information onto a display or a speaker, an operation unit 104 composed of keys, buttons and touch panels for processing the input information from the user, a control unit 105 for controlling various kinds of units provided in the mobile station 100, and a recording unit 106 for accumulating the received pieces of information and storing a program for controlling the mobile station 100. The mobile station 110 or 120 has the same composition as the mobile station 100. the information outputted by the output unit 103 may be recognized not only visually and acoustically but in a tactile manner like the finger reading.

In turn, the description will be oriented to the system of service having the present system.

The information delivered onto the mobile station is repetitively transmitted to the mobile station until the update is done or the request for stopping the transmission from the information delivery server is issued. The user enters a menu and a key word indicated on the mobile station and then requests delivery of information. This request is transmitted to the contents server 500 or 510 through the base station apparatus 201. Then, the contents server 500 or 510 serves to instruct the base station apparatus 201 to deliver the information to the mobile stations. When the indication for delivery from the contents server 500 or 510 is received, the base station apparatus 201 calls the mobile station under the control of the control unit 204 and then notifies the mobile station of a de-scrambling key to be required by the mobile station to receive the information. If the information requested by the user has been repetitively delivered, the contents server 500 or 510 instructs the base station apparatus 201 to notify the mobile station of the de-scrambling key. At this time, the contents server 500 or 510 notifies the accounting system 210 of the content of service used by the user.

The accounting system 210 is arranged to charge fees to the mobile stations for the delivered multimedia information.

The accounting system 210 is arranged to have a receiving unit 211 for receiving an information component ID for specifying the information component if the user of the mobile station opens each of the layered information components and a user ID for specifying the mobile station, a database 212 for recording the accounting records and the using fee of each information component, the database 212 provided in each mobile station, and a control unit 213 for charging for the accounting records recorded in the database specified by the user ID notified by the notifying unit, based on the notified information component ID and the using fee recorded in the database. Further, the de-scrambling key to be used by the mobile station for receiving the information is changed at each information version. Hence, this makes it possible to prevent falsely acquisition of information and charge each program fee to the mobile stations. The mobile station having received the de-scrambling key has a right of receiving the information being delivered. The information to be delivered is created by the contents editors 550 and 560 and then stored in the contents servers 500 and 510. The multicast or broadcast type information delivery service is analogous to the system where in a scrambled radio or TV broadcast, the associated receiver receives a de-scrambling key for each program so that the user can enjoy the specific program through the de-scrambling key.

Figure 2:
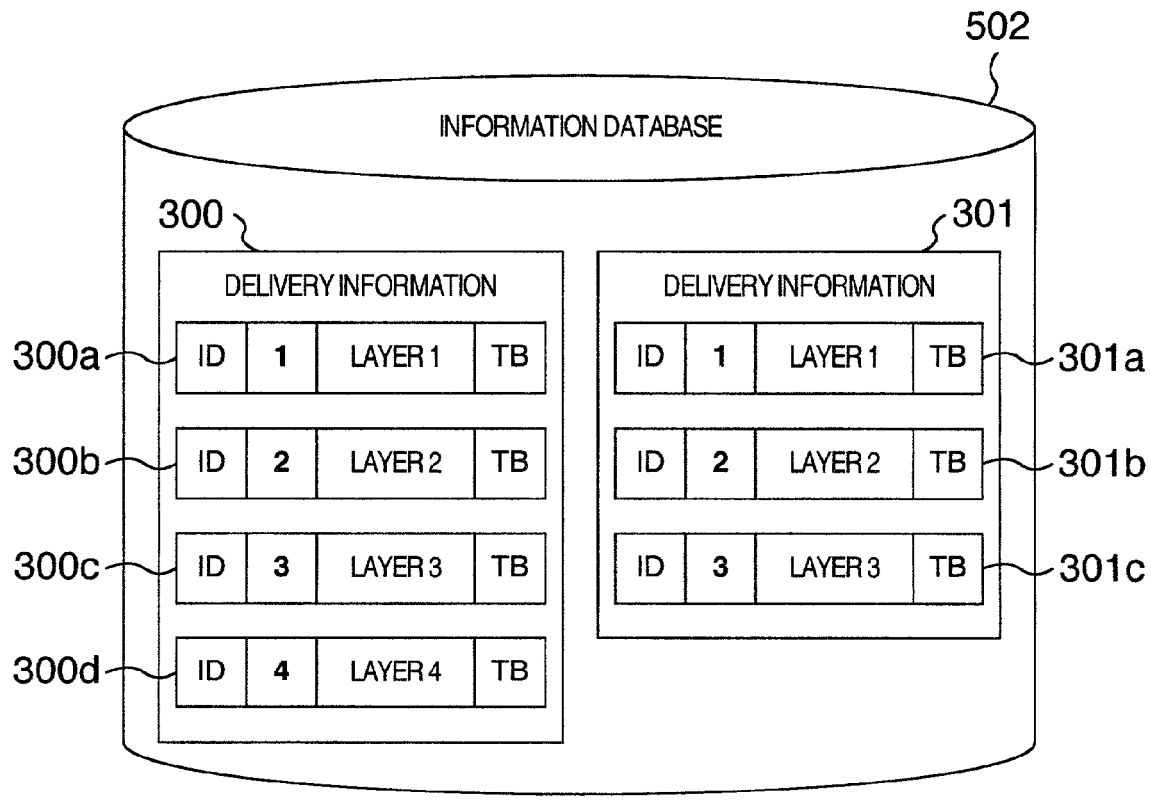
FIG. 2 is a diagram showing a configuration of an information of a database.

FIG. 2 shows the data arrangement of an information database 502 located inside of the contents server 500. The information database 502 includes multimedia information such as a still picture, voice, and a moving picture. The multimedia information is managed on the information unit to be delivered to the mobile station at a time. In the example of FIG. 2, the information database 502 is composed of delivery informations 300 and 301. These are the information units such as news or a still picture to be delivered to the mobile station at a time. Likewise, the accounting is performed on the information unit like the delivery information 300 to be delivered to the mobile station at a time. It means that the response to one transmission request or one program request from the mobile station is defined as one unit. The delivery information 300 or 301 includes the information pieces layered according to the significance or the priority of each information piece. Each of these layers has an ID for identifying which information is associated and a header for indicating the priority. Further, a TB (tale bit) is assigned to the end of each layer.

In the contents editor 550, the highest significance or priority is assigned to the information to be positively to the user. The other informations are layered as the additional information and are accumulated in the information database 502. In this embodiment, if the layer has a header with a digit of "1", it means that the highest significance is given to the layer. As the digit of the header is made higher, the significance is made lower. Which of the layer informations is additional information and which layer of the layer informations the mobile station can receive depend on the wave circumstances of the mobile station. That is, according to the wave circumstances of the mobile station, the mobile station may receive only the layer with the highest significance or priority or may receive the layer with the highest significance or priority and one or more additional information layers. In the information delivery system according to this embodiment, with an example of the delivery information 300, the layer 1 (300a) is assumed to be the layer having the information with the highest significance or priority. As the digits added to the layers are made higher such as in the sequence of the layer 2 (300b), the layer 3 (300c) and the layer 4 (300d), the significance or priority is made lower. In this embodiment, all the layers except the layer 1 are collectively called additional information. Further, the method of delivering these layers according to their significance or priority will be described with reference to FIG. 8 or later.

The delivery information 300 is illustrated to have four layers. In actual, it may be composed of a layer 1 (301a), a layer 2 (301b) and a layer 3 (301c) as shown in the delivery information 301 or it may be composed of more layers. However, the number of traffic channels is required to be smaller than that of traffic channels the mobile station can receive. The information medium to be delivered may be text, a still picture, voice, a moving picture or their mixture. It may apply to delivery of voice including music or delivery of pictures like a CM.

Figure 3:
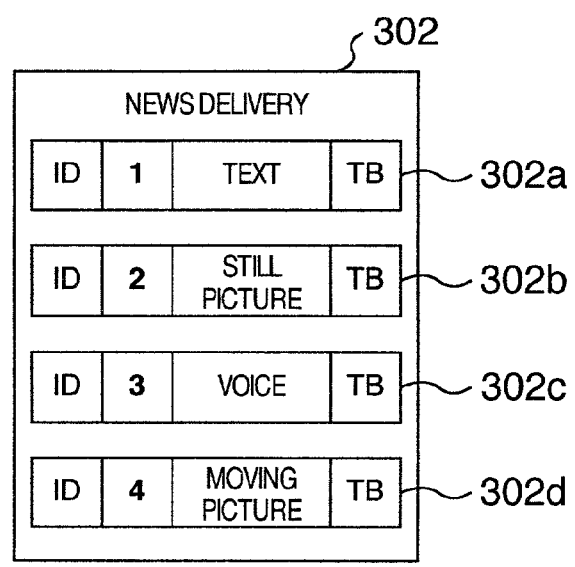
FIG. 3 is a view showing an example of delivery information.

FIG. 3 illustrates the layered arrangement of the delivery information of the information database 502 shown in FIG. 2. This is an embodiment of the delivery information. The news delivery 302 for the mobile station includes multimedia information composed of text 302a, a still picture 302b, voice 302c and a moving picture 302c. The user receives the news delivery 302 on the mobile station and can read the content of the news by the text 302a. At a time, the user can also watch the photo about the news by the still picture 302b like the newspaper. Further, the user can listen to the news or hear the BGM by the voice 302c. Moreover, the news information can be more positively grasped by the moving picture 302b. Herein, all the informations except the text 302a are additional informations. Herein, the information to be delivered may be an integration of various medium, only a still picture, voice including music, or a moving picture delivery like a CM. If the information to be delivered includes only a text medium, it is possible to layer the text contents according to their priorities.

Next, the description will be oriented to the method of layering the information components of the multimedia information.

FIG. 4 shows the layer arrangement provided in the case of the still picture delivery service. For this case, the delivery information 301 inside of the information database 502 is a still picture. Herein, it is assumed that the original still picture 310 with the highest resolution has the first to the sixteenth pixels. For simplifying the description, this original still picture 310 is assumed to be a part of the still picture to be actually delivered. This original still picture 310 is stored as the information components layered by the contents editor 550 with only its resolution lowered and without changing its picture size in the delivery information 301 located inside of the information database 502 shown in FIG. 2.

In FIG. 4, the contents editor 550 operates to create three pieces of information from the layer 1 information to the layer 3 information from the original still picture 310 inputted by the information input unit 551 after processed by the control unit 552. Concretely, the contents editor 550 operates to convert the original still picture 310 into the layer 1 information 311 having the first pixel information, the layer 2 information 312 having the third, the ninth and the eleventh pixel informations, and the layer 3 information 313 having the second, the fourth to the eighth, the tenth, and the twelfth to the sixteenth pixel informations, only the resolutions of which layer informations are reduced without changing the picture size. Then, the layer 1 information 311 is allocated to the layer 1, the layer 2 information 312 is allocated to the layer 2, and the layer 3 information 313 is allocated to the layer 3. As stated above, the layer 1 is positioned at the highest priority. It means that when the mobile station receives the layer 2, the mobile station receives the first pixel information of the layer 1 as well. Hence, the layer 2 information 312 does not include the first pixel information enclosed by a dotted line because it is overlapped with that portion of the layer 1. This holds true to the layer 3. The pieces of information received from the layers 1 and 2 are directly utilized for the corresponding portions of the layer 3. In the embodiment shown in FIG. 4, the layers are arranged so that when the mobile station receives all the layers delivered by the contents server 500, the original still picture 310 with quite high resolution can be obtained.

In turn, the description will be oriented to the layer arrangement for the service of delivering voice including music.

FIGS. 5A to 5H show the layer arrangements provided when the delivery information 301 inside of the information database 502 is the service of delivering voice including music. FIG. 5A shows the waveform of the original voice. The height of the waveform is an amplitude representing a magnitude of voice and an axis of abscissas represents a time. FIG. 5B shows the data derived by sampling the original voice with a double of its maximum frequency through the effect of the contents editor 550. This data is created by inputting the original voice into the information input unit 551 of the contents editor 550 and sampling it into a digital signal through the control unit 552. The data is stored as the layer 1 in the information database 502. FIG. 5C shows the data derived by sampling the original voice with a quadruple of its maximum frequency through the contents editor 550. This data is stored as the layer 2 in the information database 502. Further, FIG. 5D shows the data derived by sampling the original voice with an octuple of its maximum frequency through the contents editor. This data is stored as the layer 3 in the information database 502.

In this embodiment, in performing the sampling, the sampling frequency is assumed to be $2^n$ (n is an integer) of the maximum frequency. This sampling serves to prevent each sampling data from being overlapped, which also thus prevents the same information from being transmitted to the mobile station twice or more. This makes it possible to implement the efficient delivery of information. Moreover, the layer 1 information recorded in the information database 502 includes the minimum requisite information based on the sampling theorem in demodulating it from the digital signal into the analog signal. Though the number n of combinations is optional, each time n is increased, the sampling data is increased accordingly in a manner that the lowest integer (the lowest sampling frequency) is the layer 1, the second lowest integer is the layer 2, and so forth. It means that the increment of n leads to the decrement of the layer number.

When the mobile station receives only the layer 1 information, the quality of sound is not so much expected when the information is received and heard by the mobile station. As shown in FIG. 5E, however, when the mobile station has a capability of receiving the layer 1 and 2 informations, the sampling data is increased. Hence, the information can be reproduced with more fidelity than when only the layer 1 information can be received by the mobile station. It means that the quality of sound is improved. Likewise, in FIG. 5F, since the mobile station receives the layer 1, the layer 2 and the layer 3 informations, the quality of sound is further improved. Hence, the contents editor 550 operates to layer the original voice and then store the layered data in the information database 502 inside of the contents server 500 so that if the mobile station enables to receive more layers, the quality of voice including music is improved.

As mentioned above, by delivering the layered voice, the user can enjoy the variable quality of voice to be delivered according to the wave circumstances of his or her mobile station. However, if the voice is heard in real time, no matching of sounds is carried out in synthesizing the sounds on the mobile station. Hence, the mobile station has to synchronize the layers with each other. Hence, the base station apparatus has to change the transmission speed for synchronizing the layers with each other according to the sampling data amount of each layer. As means of taking synchronization, the method may be referred in which the synchronous information is contained in the header of each layer packet. The mobile station enables to synchronize the received layers with each other on the basis of the synchronous information added to the header.

If no synchronization is taken on the basis of the synchronous information of the header, it may be predetermined that the mobile station receives only the layer 1 information and abandons the informations of the other layers. In this case, though the quality of sound is degraded, the base station apparatus is not required to perform some controls such as retransmission of data to the mobile station whose synchronization is shifted and re-synchronization of the mobile station. It means that more efficient delivery of the information is made possible. Whether or not the synchronization is taken can be determined by the synchronization of each mobile station with the base station apparatus.

In a case that after the received layer information is temporarily stored in a storage unit such as a buffer, the voice is reproduced, the mobile station is not required to synchronize the layers with each other. However, before reproducing the data, the data are rearranged on the basis of the information about which portion of the voice may correspond to the data contained in the header. These processes are executed by the software stored in the storage unit provided in the mobile station.

FIG. 6 is a flowchart showing a procedure of layering the voice and music. The provider of the contents inputs the information to be delivered to the information input unit 551 of the contents editor 550 (S1000). Then, the storage unit 553 of the contents editor 550 stores the inputted information as an analog signal (S1001). The control unit 552 calls this data from the recording unit 553 and then quantizes the voice and music composed of an analog signal into the corresponding digital signal by sampling the data through the changed sampling frequency (S1002). This data contains the information at its header so that the mobile station can rearrange the data by itself according to the amount and the sequence of the received data.

The control unit 552 operates to add the ID for identifying the information and the layer number to the sampled information for layering the information (S1003). Then, the layered information is stored in the recording unit 553 (S1004). When a set time or a time instructed by the contents provider comes, the information is shifted to the database provided in the contents server and then the information delivery server operates to transmit the information to the mobile station (S1005).

Then, the description will be oriented to the layer arrangement for the service of delivering a moving picture.

Figure 7A:
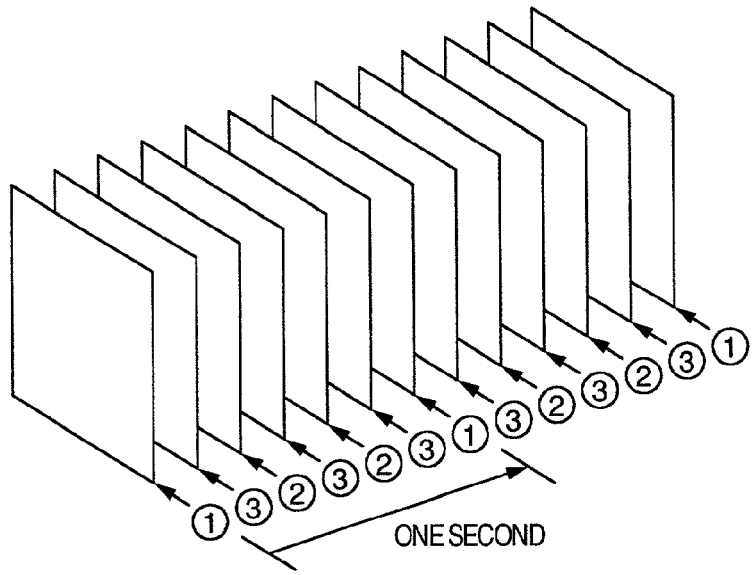
FIGS. 7A to 7D are views showing layer arrangements provided in the case that the delivery information is a moving picture.
Figure 7B:
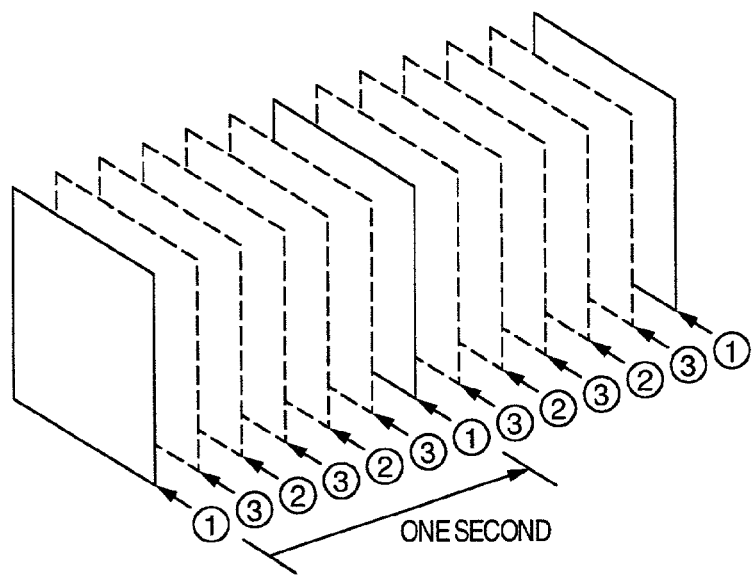
Figure 7C:
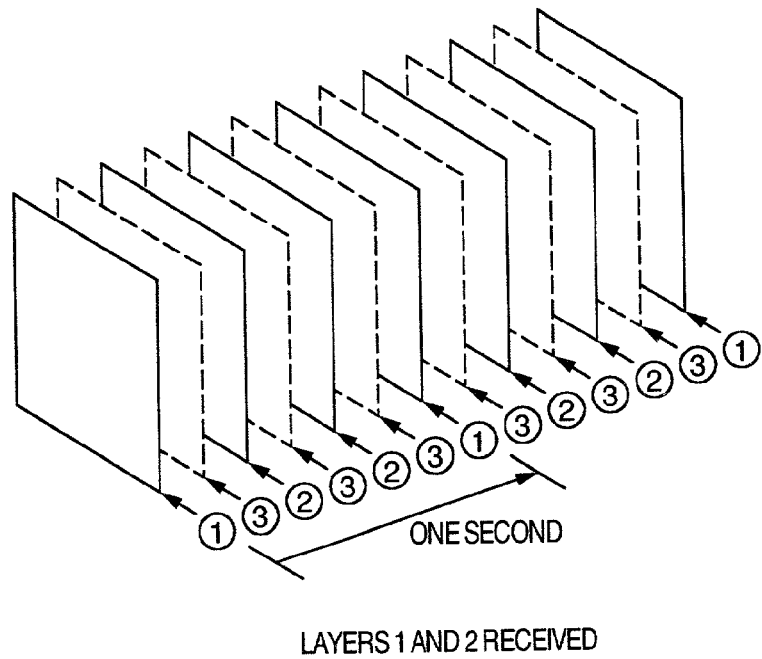
Figure 7D:
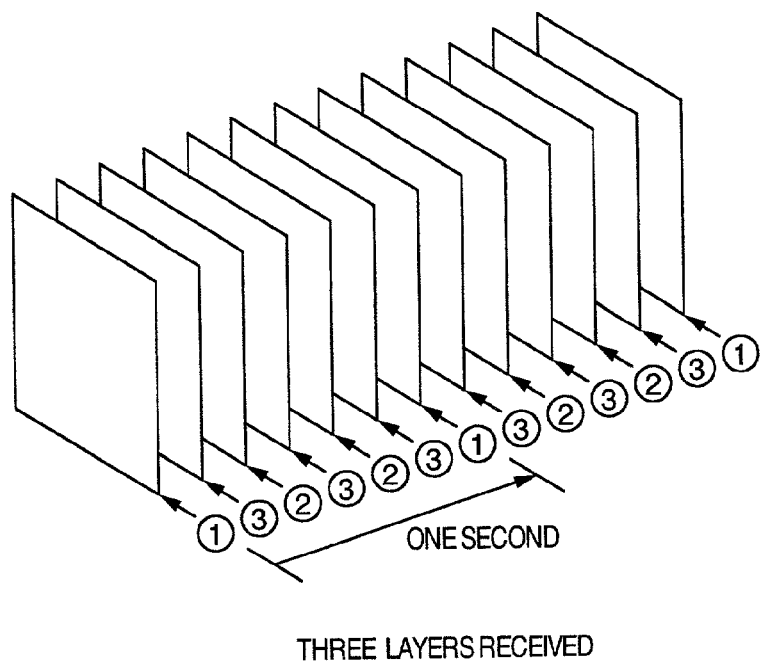

FIGS. 7A to 7D shows the layer arrangement for the moving picture delivery service in a case that the delivery information 301 stored in the information database 502 contains only a moving picture. Herein, it is assumed that the original moving picture has a speed of six frames per one second. In FIGS. 7A to 7D, (1), (2) and (3) represents the layer 1 information, the layer 2 information and the layer 3 information, respectively. The contents editor 550 operates to allocate the frame of the original moving picture to the layers so that the layer 1 has a half of an information amount of the layer 2 and a third of an information amount of the layer 3. Further, the control unit 552 of the contents editor 550 performs the allocation of the information to the layers so that the frame intervals of the original moving picture are made equal to each other according to the layers received by the mobile station. For example, as shown in FIG. 7B, when the mobile station receives only the layer 1 information, the moving speed is one frame per one second. It means that the moving picture is changed every one second. When the mobile station receives the layer 1 and the layer 2 informations, the moving speed is three frames per one second. It means that the moving picture is changed every 0.33 second. When the mobile station receives the layer 1, the layer 2 and the layer 3 informations, the moving speed is six frames per one second. It means that the moving picture is changed every 0.17 second. If the mobile station receives only the layer 1 information (FIG. 7B), the number of frames is one per one second. Hence, the change of the moving picture is quite unnatural like the frame-advance reproduction such that a frame is changed per one second. As shown in FIG. 7C, however, in a case that the mobile station receives the layer 1 and the layer 2 informations at a time, the number of frames per one second is three. Hence, the quality of the moving picture is improved. Then, in a case that the mobile station receives three layer informations (see FIG. 7D), the same content as the original moving picture can be obtained. As mentioned above, the data for guaranteeing the minimum quality for the service is allocated to the layer 1 and the data for improving the quality is allocated to the other layers. In the example shown in FIGS. 7A to 7D, though the number of frames per one second is six, the motion of the moving picture is made smoother as the number of frames per one second is increased. Further, in order to prevent the change of the moving picture from being unnatural, it is preferable to keep the frame intervals constant even if any layer is received. For this purpose, the control unit 552 provided in the contents editor 550 operates to calculate the total number of frames from the original moving picture and layer the moving picture so that the frames are located at regular intervals. In this delivery of the moving picture, like the voice, the mobile station operates to synchronize the layers with each other when the data is received and rearrange the data on the basis of the information recorded in the header of the data for indicating the right position of the picture frame before reproducing the picture.

In turn, the description will be oriented to the hardware arrangement of the communicating device 203 located in the base station apparatus 201. In the case of delivering information, the base station apparatus 201 has a role of transmitting a radio signal containing the information to be delivered to the mobile station.

FIG. 8 shows a circuit block of a transmitting section of the communicating device 203.

The circuit block shown herein enables to transmit four layer informations from the layer 1 to the layer 4. The informations of the layer 1, the layer 2, the layer 3 and the layer 4 are transmitted from the contents server 500 and then temporarily stored in the recording unit 205. Then, the informations are inputted into a data distributor from which the layer 1 information is inputted into a speed changer 480, the layer 2 information is inputted into a speed changer 481, the layer 3 information is inputted into a speed changer 482, and the layer 4 information is inputted into a speed changer 483. These speed changers 480 to 483 perform a process of transmitting the informations of the layers 1 to 4 as changing their data rates. The informations processed by these speed changers 480 to 483 are inputted into coders 400 to 403, respectively. Each of the coders 400 to 403 operates to modulate the information sent from the contents server 500 through the effect of a modulating circuit located in each encoder. Then, the modulated informations are scrambled with a PN code through an EX-OR circuit. The PN code is generated by PN code generators 405 to 408. Herein, the PN code is used for preventing the information from being intercepted by a third party, that is, a person who has no right of transmitting and receiving the information. For the PN code is used a unique code like the Long Code PN used in the IS-95 radio system.

The signals scrambled by these PN codes are diffused into a predetermined signal band with the diffusion codes. The diffusion code is generated by the corresponding one of the diffusion code generators 420 to 423, each of which is arranged to generate a diffusion code of the corresponding chip rate. In the radio communication system arranged to use the CDMA technology, since plural channels are located on the same frequency band, these diffusion codes are used for identifying the channels. Hence, for each channel is used a unique diffusion code.

For example, in the IS-95 radio system that is currently serviced, for the diffusion code is used a 64-degree Walsh code. Then, the signals diffusely modulated by the diffusion codes generated by the diffusion code generators 420 to 423 are subject to the digital modulation like QPSK through the effect of the modulators 425 to 428, in which the Pilot PN code is added to the diffusely modulated signals. The Pilot PN code has the same chip rate as the signal to be transmitted by the mobile station for identifying and synchronizing the base station. The modulated radio signals are frequency-converted by the RF units 415 to 418, respectively. Then, the signals are amplified up to the power required for delivery to the mobile station through the effect of the amplifiers 410 to 413, respectively. The signals amplified by these amplifiers 410 to 413 are integrated to one signal and then is transmitted to the mobile station through an antenna 202.

Next, the description will be oriented to the hardware arrangement of a communicating device 102 located in the mobile station 100 for receiving information delivered by the base station apparatus.

Figure 9:
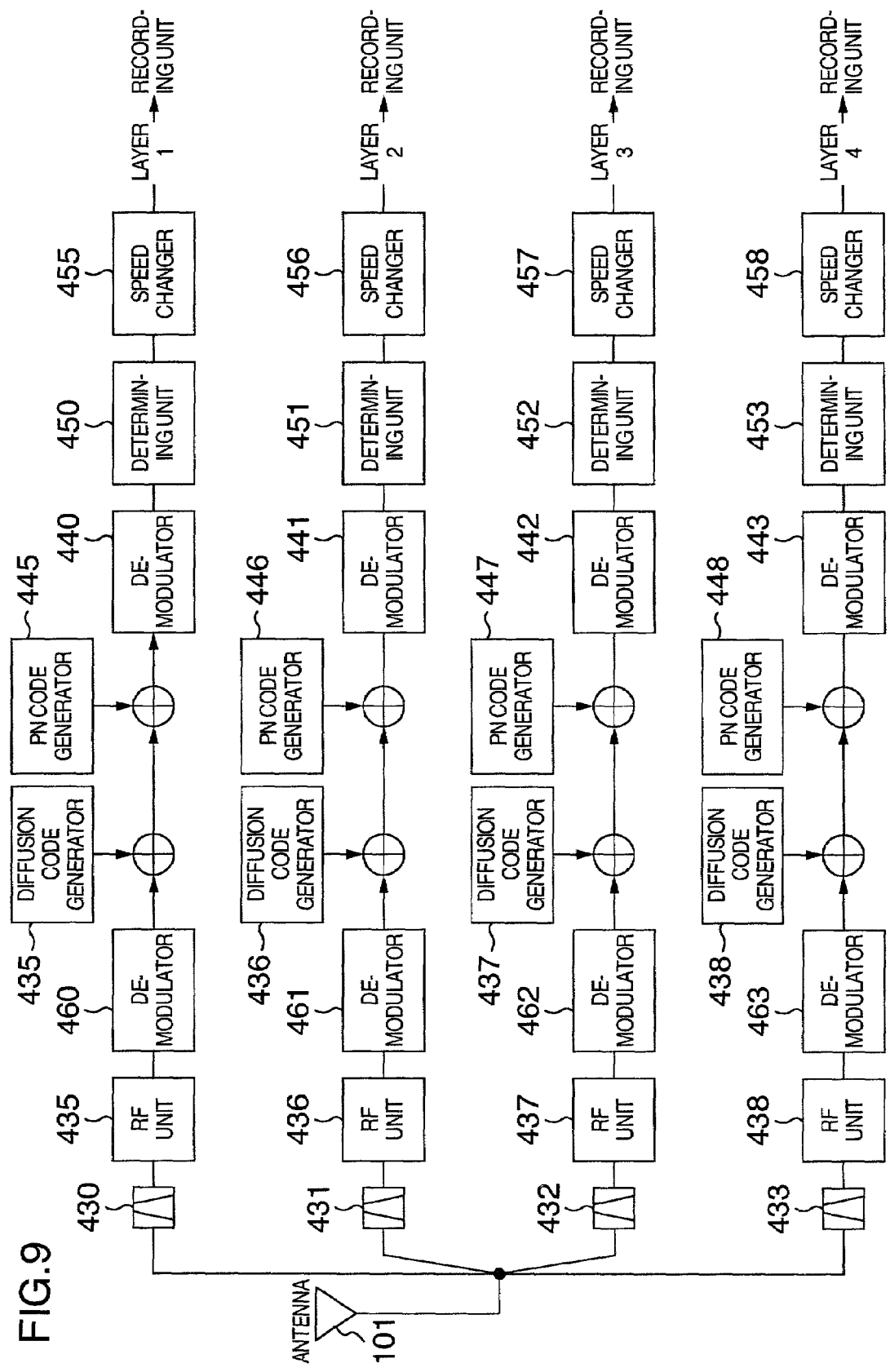
FIG. 9 is a block diagram showing a receiver circuit located in a mobile station.

FIG. 9 shows a circuit block of a receiving section of the communicating device 102 located in the mobile station 100.

The information delivered as a radio signal from the base station apparatus 201 is converted into an electric signal through an antenna 101. Then, the signal passes bandpass filters 430 to 433 in which the necessary traffic channel signals are picked up. Then, the traffic channel signals are subject to some processes such as frequency conversion in the RF units 435 to 438, respectively. Next, the processed signals are put into the demodulators 460 to 463 in which these signals are demodulated into the digital signals. Afterwards, these signals are reversely diffused with the diffusion codes. These diffusion codes are generated by the diffusion code generators 435 to 438, respectively. The diffusion codes used herein are the same codes as those used for the diffuse modulation in the base station apparatus 201. In addition, the method of notifying the mobile station 100 of the diffusion codes used in the base station apparatus 201 will be described below.

The channel signals picked by the reverse diffusion are de-scrambled with the same PN code as that used in scrambling those signals through the use of the PN code generators 445 to 448, respectively. Then, these signals are demodulated into the original information before being modulated in the base station apparatus 201. The demodulated information is inputted into the determining units 450 to 453 in which it is determined how analogous to the signal transmitted by the base station apparatus 201 the signal received by the mobile station 100 may be. In the ideal system, the transmitted information is quite same as the received information. However, the carrier for carrying the information passes through a transmission medium with lots of noise like interference. Hence, the code error takes place in the received information. The determining units 450 to 453 operate to determine how much of information is dropped on the carrying way by measuring the frame error rate of the received information or the S/N ratio. In the multicast or the broadcast case, unlike the unicast case, it is difficult to retransmit the dropped piece of information to the proper mobile station. In this embodiment, therefore, if it is determined that the frame error rate or the S/N ratio comes to a certain value and the restore of the received information is made difficult, the channel information is not outputted from the determining units 450 to 453.

If the determining units 450 to 453 determine that the restore of the received information is made possible, these layer informations are outputted from the determining units to the recording unit 106, respectively. Then, these layer informations are integrated by the control unit 105 and then outputted onto the display located in the mobile station 100 through the effect of the output unit 103. The output unit may be arranged so that the guide information of each information component contained in the frame determined to meet the predetermined communication quality reference by the determining unit 450 to 453 may be outputted onto the display or the like. The guide information may include the tariff information about the using fee of each information component. In this embodiment, based on the guide information outputted by a guide output unit, the user of the mobile station may use the multimedia information of the frame having the target information component.

Next, the operation of the base station apparatus 201 will be described.

Figure 10:
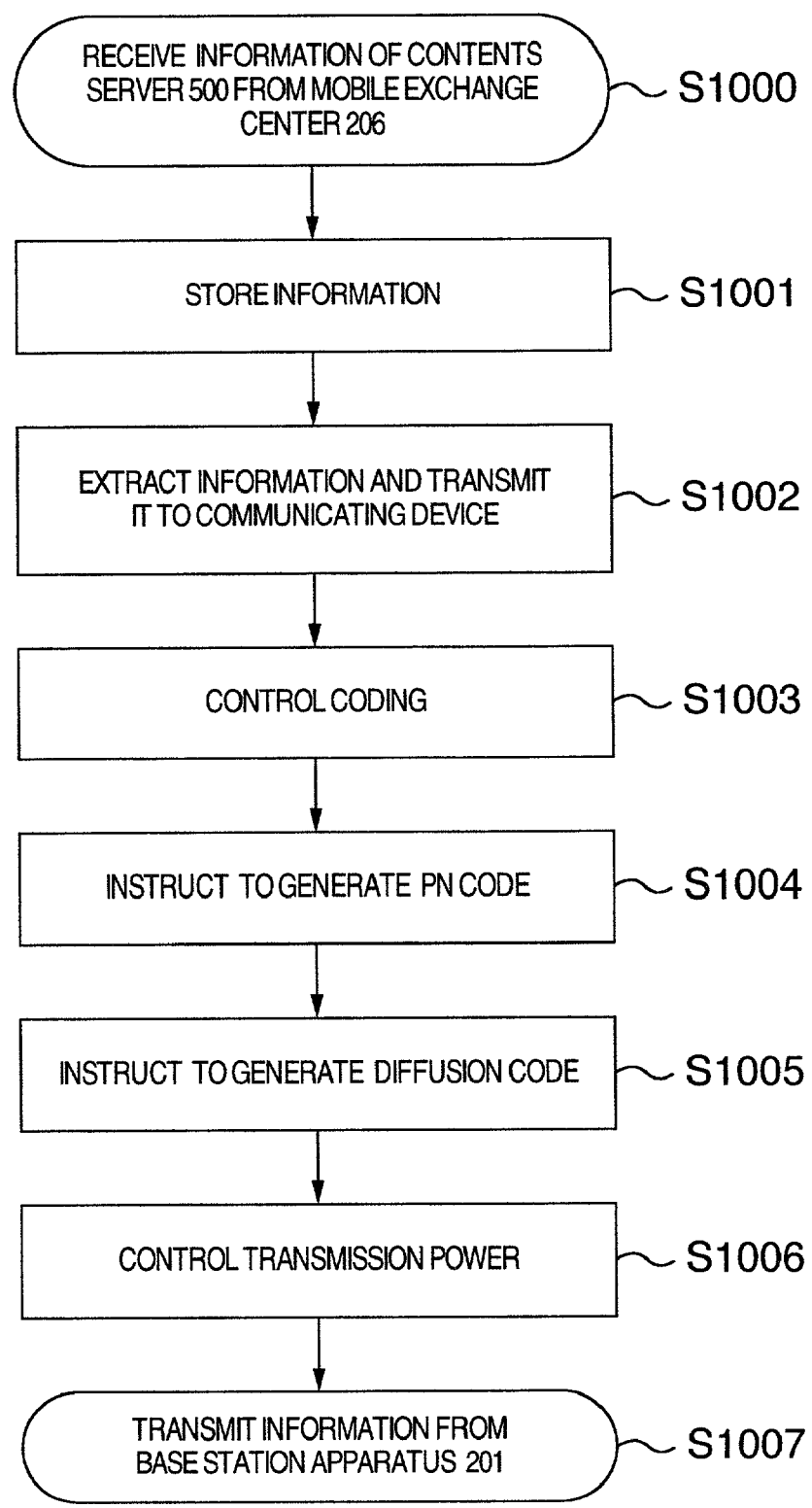
FIG. 10 is a flowchart showing an operation of a control unit located inside of the base station apparatus.

FIG. 10 is a flowchart showing the operation of the control unit 204.

When the base station apparatus 201 receives the information components layered at a specific unit like the news information from the contents server 500 through the mobile exchange unit 206 (S1000), the base station apparatus 201 operates to store the information in the recording unit 205 located in the base station apparatus 201 (S1001). At a time, the control unit 204 enables to determine the priority of the information of each layer on the header of the information packet.

On the termination of receiving an information unit, the control unit 204 picks up the information at each layer from the recording unit 205 and then transmit these layers to the corresponding transmitters located in the communicating device 203 shown in FIG. 8 (S1003). Further, the control unit 204 operates to instruct the PN code generators 405 to 408 to generate the PN codes and scramble the coded information (S1004) so that the user who does not join in the multicast or the broadcast service cannot receive the information. Then, the control unit 204 operates to instruct the diffusion code generators 420 to 423 to generate the diffusion codes with which the scrambled information is diffused to the predetermined band and then to diffuse the information signal (S1005). After being diffused, the control unit 204 operates to control the power gains of the amplifiers 410 to 413 so that the transmission power may reach a certain power level and thereby control the transmission power from the antenna 202 (S1006). The information from the contents server 500 is controlled as shown in FIG. 10, so that the information is transmitted from the antenna 202 of the base station apparatus 201 to the mobile station (S1007). This makes it possible to deliver the multimedia information to only the mobile station that joins in a specific service, thereby making the pay service of the information delivery possible.

Next, the operation of the mobile station will be described below.

Figure 11:
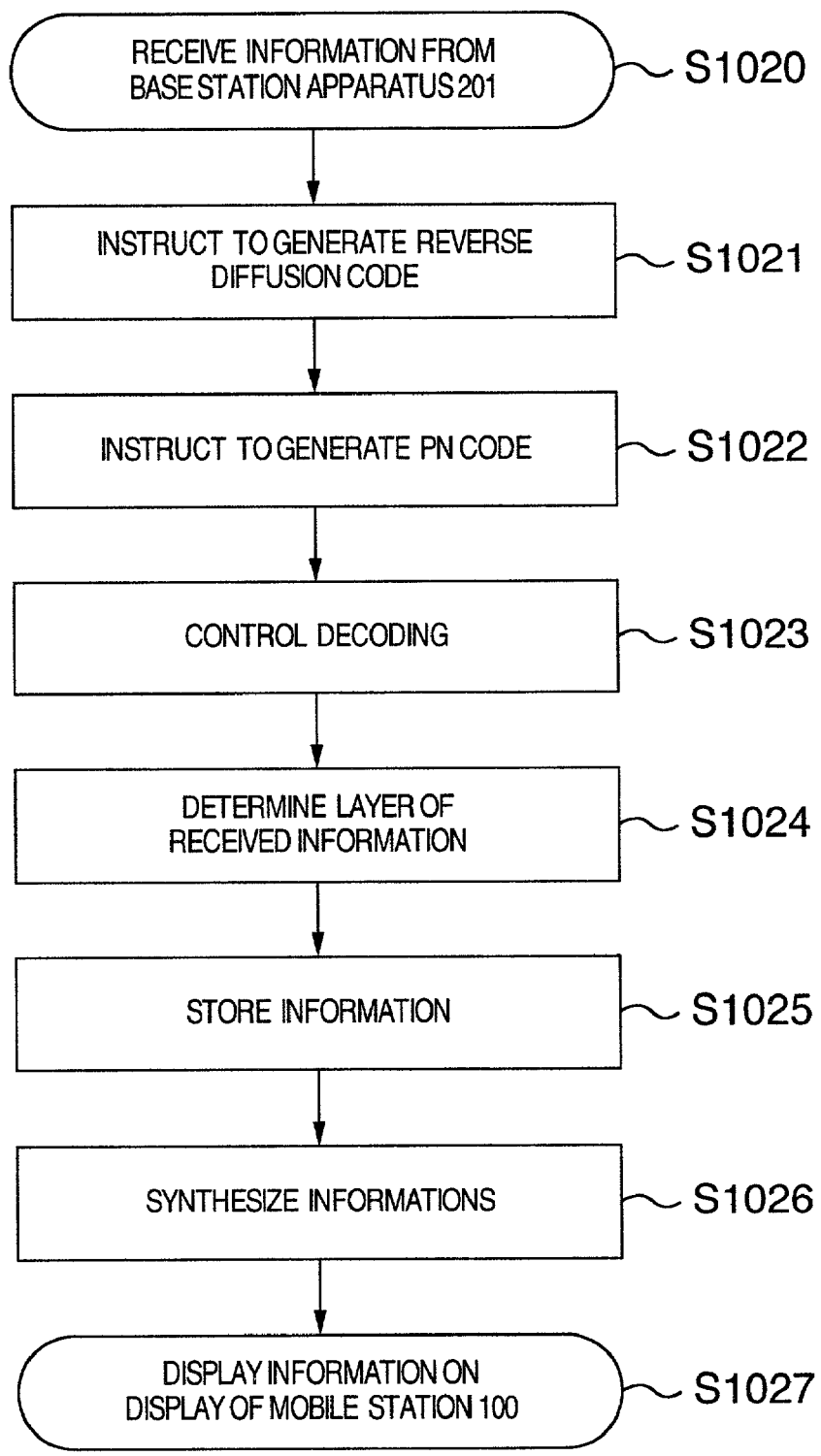
FIG. 11 is a flowchart showing an operation of a control unit located inside of the mobile station.

FIG. 11 is a flowchart showing the operation of the control unit 105.

The control unit 105 operates to receive the information transmitted from the base station apparatus 201 through the antenna 101 and then pick up the required channel signals through the bandpass filters 430 to 433 (S1020). Then, for returning the diffused signal of the picked channel into the signal band before diffusion, the control unit 105 instructs the diffusion code generators 435 to 438 to generate the same reverse diffusion codes as those used in the base station apparatus 201 (S1021). When the signal is converted into the frequency band before diffusion with the generated reversely diffusion codes in the base station apparatus 201, the control unit 105 instructs the PN code generators 445 to 448 to generate the same PN codes as those used for scrambling in the base station apparatus 201 (S1022). The control unit 105 controls the decoders 440 to 443 and then decodes the de-scrambled information (S1023). Further, the control unit 105 calculates the frame error rate of the decoded information or the S/N ratio and instructs the determining units 450 to 453 to determine the proper layer from which the information is to be received (S1024). Further, the control unit 105 instructs the recording unit 106 to store the information having passed the determination of the reception therein (S1025). When all the layer informations are stored, these informations are synthesized as an information unit like news (S1026). Then, the control unit 105 operates to transmit the synthesized information to the output unit 103 of the mobile station 100 and then output the news onto the display (S1027).

Then, the description will be oriented to how each layer information is delivered and the service is discriminated in each mobile station.

Figure 12A:
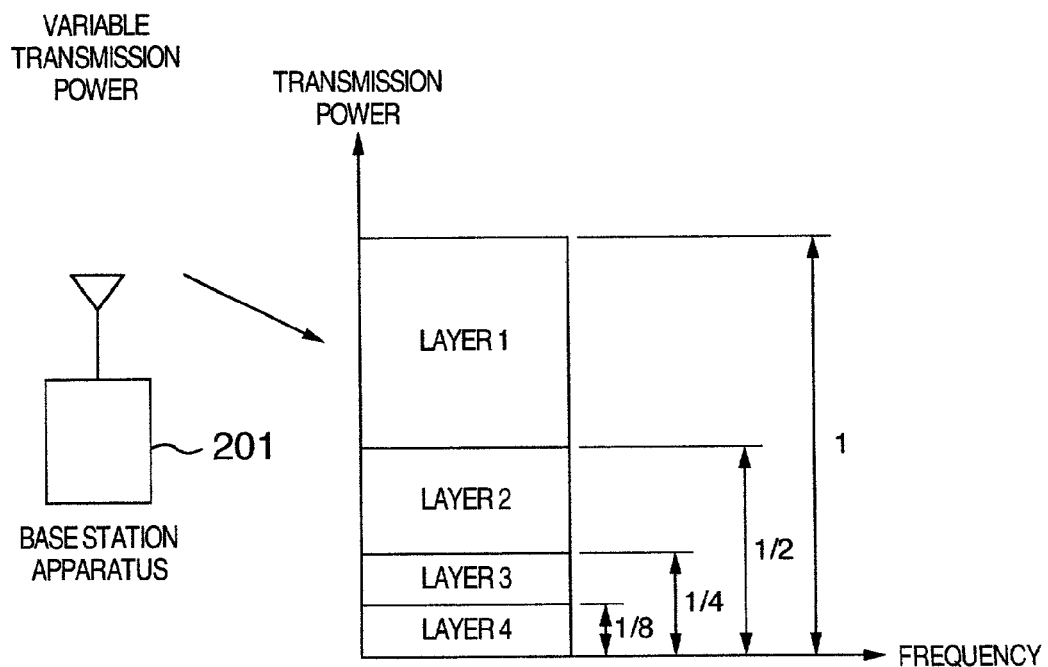
FIGS. 12A and 12B are views showing relation between the layers and the transmission power of the base station apparatus.
Figure 12B:
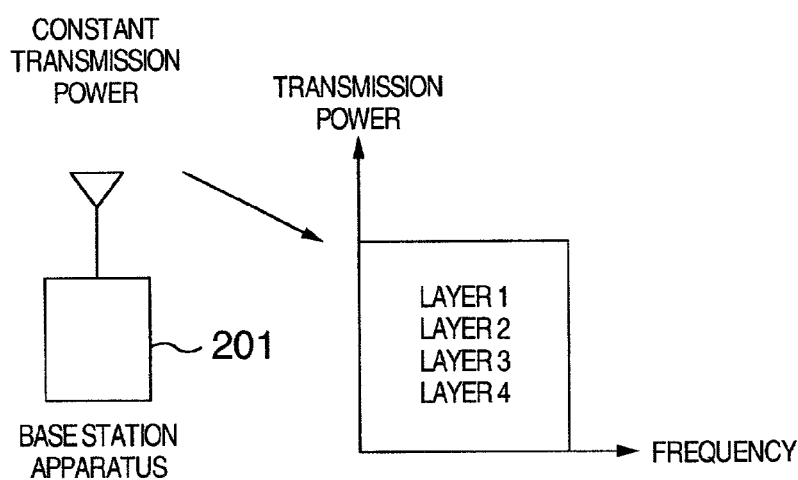

FIGS. 12A and 12B shows the relation between the layer of the signal transmitted from the base station apparatus and the transmission power.

FIG. 12A shows the case in which the transmission power of each traffic channel is variable, while FIG. 12B shows the case in which the transmission power is constant.

In a case that each traffic channel has a variable transmission power, the transmission power at which the traffic channel containing the layer 1 information of the highest significance or priority is transmitted to the mobile station is relatively represented as 1. Then, the traffic channel of the layer 2 with the second highest significance or priority is transmitted at a half of the transmission power for the layer 1. Then, the traffic channel of the layer 3 with the third highest significance or priority is transmitted at a half of the transmission power for the layer 2. That is, the transmission power ratio of the traffic channel of the layer 3 is ¼ of that of the layer 1. The transmission power ratio of the layer 4 with the lowest significance or priority is ⅛ of that of the layer 1. These transmission powers are controlled by the amplifier shown in FIG. 8.

On the other hand, as described with reference to FIG. 9, the mobile station determines whether or not the channel can be received at a frame error rate of the received signal or an S/N ratio. Hence, in a case that all the parameters like the diffusion coefficient and the data rate except the transmission power are adjusted to be the same, the traffic channel containing the layer 1 information can be received even in the bad wave circumstances because it is transmitted at the highest transmission power, while the traffic channel containing the layer 4 information with the lowest transmission power cannot be received if the wave circumstances are not good because it is transmitted at the lowest transmission power.

In the multicast or the broadcast, it is frequent that the information is constantly transmitted. Hence, if all traffic channels are transmitted to the mobile station at a maximum transmission power, the interference to the traffic channel used for another speech is made greater. If the transmission power from the base station apparatus 201 is degraded stepwise, the following merits may be obtained. That is, as to the traffic channel containing the additional information with a lower significance or priority, the interference can be suppressed by lowering the transmission power of delivering information. Moreover, the mobile station located in the good wave circumstances may receive the additional information.

In the foregoing example, the base station apparatus operates to reduce to a half the transmission power of the traffic channel containing the layer with a relatively lower significance or priority. For example, the transmission power ratios of the layer 1, the layer 2 and the layer 3 may be adjusted to 1, ¾ and ¼, which correspond to the priority level of the layer information.

Next, the description will be oriented to the method of delivering information in the case that the traffic channel of each layer is transmitted at a constant transmission power as shown in FIG. 12B.

FIG. 13A is a block diagram showing a part of a transmitter included in the base station apparatus 200 shown in FIG. 8.

FIGS. 13B, 13C and 13D are tables showing a diffusion coefficient, a coding coefficient, and a data rate with a time ratio changed of each layer. The numbers indicated in the left-hand of the table represent the layer numbers. Herein, as an example, the chip rate of the signal transmitted through the antenna 202 is set to be 1.2288 Mchip/s that is the same as the IS-95 radio system. As indicated in FIG. 12B, the transmission power is constant.

At first, the description will be oriented to the method of delivering information in the case of changing the diffusion coefficient of the diffusion code of the diffusion code generator 420 (see FIG. 13B).

In a case that the data rate of the layer 1 to be inputted into the transmitter of the base station apparatus 200 is 9.6 kbit/s, assuming that the coding coefficient is constant, for example, ½ for all the traffic channels, the bit rate at the input of the diffuser is 19.2 kbit/s. At a time, in a case that the chip rate of the signal transmitted through the antenna 202 is kept at 1.2288 Mchip/s, the diffusion coefficient of the diffuser is 64. Next, assuming that the data rate of the layer 2 is 19.2 kbit/s, since the coding coefficient is ½ like the above, the bit rate of the information to be inputted by the diffuser is 38.4 kbit/s. Likewise, in a case that the chip rate is kept at 1.2288 Mchip/s, the diffusion coefficient of the diffusion code is 32. For the case of the layer 2, since the data rate of the information is a double of the layer 1, the diffusion coefficient is reduced into a half for the purpose of keeping the chip rate at 1.2288 Mchip/s. As to the layer 3, in a case that the data rate is a tripe of that of the layer 1, that is, 38.4 kbit/s, the diffusion coefficient is a third (⅓) of that of the layer 1, that is, 16. Further, as to the layer 4, in a case that the data rate is four times as large as that of the layer 1, that is, 6.8 kbit/s, the diffusion coefficient is a fourth (¼) of that of the layer 1. These data rates are adjusted by the speed changers 480 to 483 as being instructed by the control unit 204.

In the radio communication system arranged to use the CDMA technology, as the diffusion coefficient is larger, the adverse effect on the signal power by the noise power such as interference is made lower. The receiver of the mobile station determines whether or not the subject traffic channel should be received on the frame error rate or the S/N ratio of the traffic channel. Hence, like the layer 1, the traffic channel with a high diffusion coefficient may have a low frame error rate and a high S/N ratio because the high diffusion coefficient is effective to prevent the noise power. Hence, such a traffic channel can be positively received. Conversely, like the layer 4, the traffic channel with a low diffusion coefficient may have a high frame error rate and a low S/N. In some relatively worse wave circumstances, therefore, the frame error rate or the S/N ratio does not meet the requisite value, so that the determining unit of the receiver determines that the reception is impossible. As described above, by controlling the diffusion coefficient of the transmitter of the base station apparatus 201, it is possible to intentionally change the error endurance to each layer information. Hence, even if the transmission power is made constant, the number of layers to be received is made variable in each mobile station, so that the amount of information to be received may be changed according to the wave circumstances of the mobile station.

As described with reference to FIGS. 4 to 7, if the amount of information is not constant in each layer, by transmitting the information as varying the data rate, the receiving times of all the layer informations are substantially kept constant. For example, in FIG. 5, the layer 2 has a double of the information amount of the layer 1 and the layer 3 has a quadruple of the information amount of the layer 1. However, if these informations are transmitted to the mobile station at the same data rate, the received sound is not close to the original sound. By transmitting the layer 2 information at a double of the data rate of the layer 1 and the layer 3 information at a quadruple of the data rate of the layer 1, the received sound is close to the original sound.

Next, the description will be oriented to the delivery of information in the case that the coding coefficient is changed (see FIG. 13C). Like the case of the diffusion coefficient, it is assumed that the traffic channel of each layer has the same transmission power and the diffusion modulation speed is 1.2288 Mchip/s. In this example, it is assumed that the data rate of each layer is constant, for example, 9.6 kbit/s. Herein, like the case of the diffusion coefficient, by changing the diffusion coefficient of the traffic channel of each layer, the number of the traffic channels to be possibly received is made variable in each mobile station. Herein, by intentionally changing not the data rate but the coding coefficient through the control unit, the diffusion coefficient is changed. For the layer 1, the coding coefficient is ½. Hence, when the data rate is 9.6 kbit/s, the diffusion coefficient is 64. If the data rate is constant in each layer, the coding coefficient of the layer 2 is ¼, that is, a double of that of the layer 1. It means that the diffusion coefficient is a half of that of the layer 1, that is, 32. Likewise, since the coding coefficient is ⅛ in the layer 3, the diffusion coefficient is 16. Like the foregoing diffusion coefficient, the mobile station can receive the traffic channel of the layer 1 with a high diffusion coefficient. However, the layer with a lower diffusion coefficient may not be received in a relatively bad wave circumstances or if the distance from the base station apparatus 201 is relatively far away.

Next, the description will be oriented to the delivery of information in the case that the transmission time is changed (see FIG. 13D). In this case, by changing the diffusion coefficient like the above case, the number of traffic channels to be received may be variable in each mobile station. Herein, it is assumed that the coding coefficient is the same and the chip rate is the same as the above case, that is, 1.2288 Mchip/s. Though the data rates of the layers 1 and 2 are both 9.6 kbit/s, by intentionally making the data rate of the layer 2 twice as large as that of the layer 1 through the control unit, the diffusion coefficient can be reduced to a half of the data rate, that is, 32. In this case, since the transmission of the layer 2 information needs half as long a time as that of the layer 1 information, the transmission time of the base station apparatus 201 may be reduced into a half. However, since the diffusion coefficient is low, the area where the receive of the layer 2 is made possible is smaller than the area where the receive of the layer 2 is made possible. However, since the traffic channel having a faster data rate serves to reduce the transmission time of the data from the base station apparatus 201, advantageously, it is possible to suppress the interference caused by the other traffic channels. As described above, the change of the transmission time of the data with the same information amount resulting from the intentional change of the data rate makes it possible to vary the number of the traffic channels to be received by each mobile station.

Then, the description will be oriented to the method of performing the multicast service.

Figure 14:
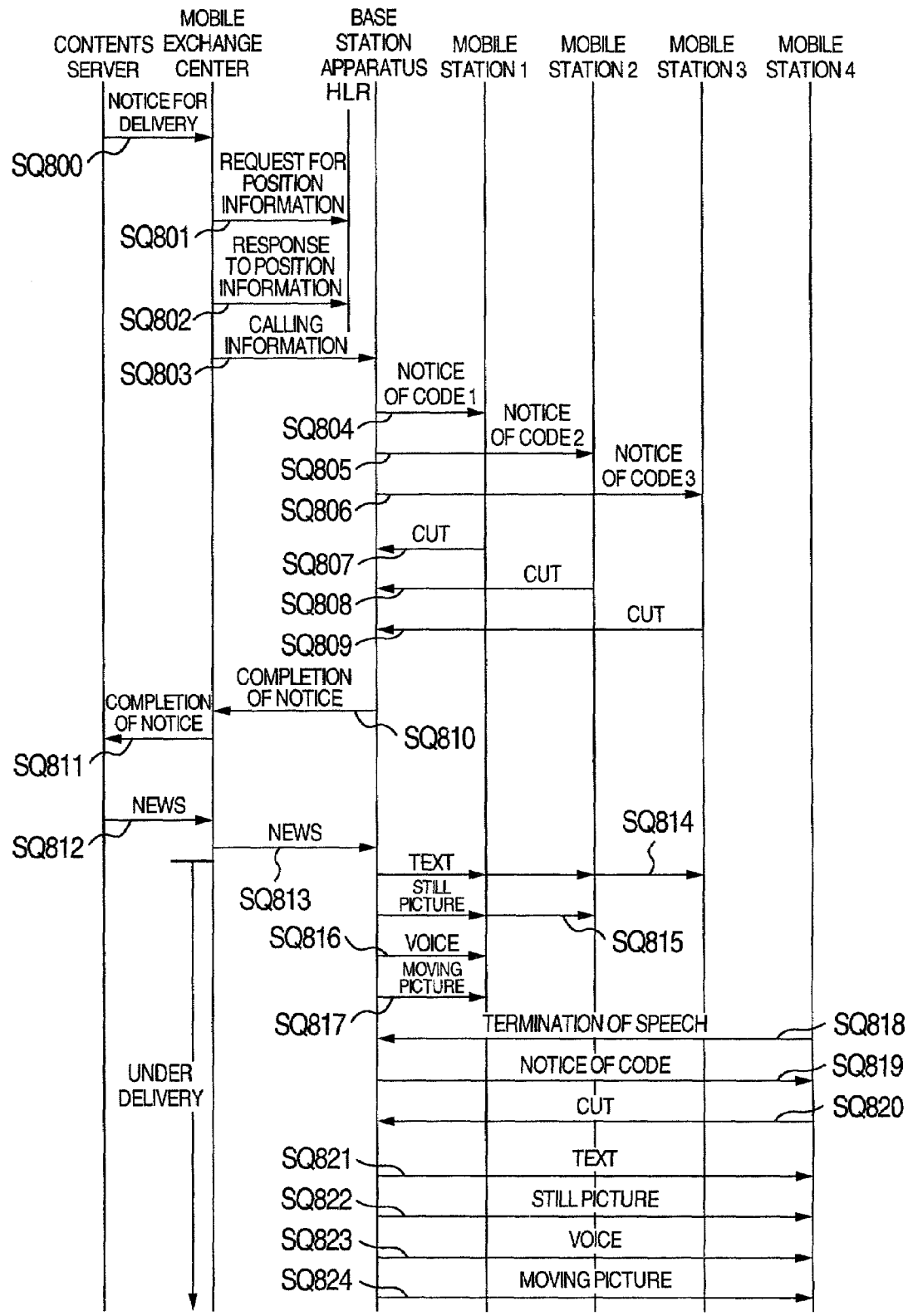
FIG. 14 is a view showing a sequence appearing in multicasting information (automatic delivery type)

FIG. 14 is a sequence view in the case of the multicast.

As an example, the description will be expanded on the assumption that the mobile stations 1 to 4 join in the service. Moreover, this sequence is illustrated to enable the contents server to automatically deliver the information to the mobile station when a certain time comes or the information is updated. In the radio delivery system arranged to use the CDMA technology, to receive the delivered information, it is necessary to notify the mobile station of the PN code and the diffusion code used for de-scrambling and channel identification. In order to allow each mobile station to restore the properly received information, it is also necessary to notify the mobile station of the diffusion coefficient and the data rate coding coefficient of each layer. The delivered information is contained in the contents server.

The contents server operates to transmit to the mobile exchange center the notice of delivery containing the information on the users who join in the service before starting the information delivery (SQ800). On this information on the users, the mobile exchange center inquires of the HLR where the mobile station owned by the user is located (SQ801). In response, the HLR searches the proper base station apparatus that takes responsibility for the object mobile station from the database located inside and notifies the mobile exchange center of the result (SQ802). Based on this information, the mobile exchange center notifies the base station apparatus that takes responsibility for the mobile station of the calling information on the basis of this information (SQ803). The base station apparatus that has received the information operates to call the mobile stations covered thereby for notifying them of the PN code and the diffusion code used for de-scrambling and channel identification. Then, using the traffic channel, the PN code and the diffusion code are transmitted (SQ804 to SQ806). At this time, the diffusion coefficient, the data rate and the coding coefficient of each layer information are transmitted as well.

In the example shown in FIG. 14, since the mobile station 4 is in speech, the PN code and the diffusion code are not given to it. The ground of the use of the traffic channel is that these codes are prevented from being received by the mobile stations that do not join in the service. Though each traffic channel uses the corresponding PN code and diffusion code, all mobile stations receive the same PN code and diffusion code. In receipt of the PN code and the diffusion code, each mobile station cuts off the traffic channel (SQ807 to SQ809). On the termination of this cutting, the base station apparatus request the contents server to deliver the information (SQ810 to SQ811). In response, the contents server operates to transmit the information to be delivered, that is, the news to the mobile exchange center. Then, the mobile exchange center operates to transmit the news to the base station apparatus that covers the subject mobile station (SQ812 to SQ813).

The information to be delivered is the news information including text, a still picture, voice, and a moving picture. The base station apparatus operates to layer the information as shown in FIG. 3, allocate each layer to the corresponding traffic channel, scramble and diffusely modulate the layered information through the use of the same PN code and diffusion code as those having been notified to the mobile station, and then deliver each layer information through the effect of the method described with reference to FIGS. 12A and 12B and FIGS. 13A and 13B (SQ814 to SQ817). In this example, the mobile station 1 receives all the layers including text, a still picture, voice and a moving picture, the mobile station 2 receives text and a still picture, and the mobile station 3 receives only the text (SQ814 to SQ817).

If the mobile station is in speech, it is the mobile station 4. When the speech is terminated, the mobile station 4 operates to transmit a message of the termination of the speech to the base station apparatus. Though the base station 4 joins in the multicast service, since it is in speech, the mobile station 4 disables to receive the foregoing PN code and diffusion code and the news being delivered. Then, after the mobile station 4 terminates its speech, the base station apparatus calls the mobile station 4 and then notifies it of the PN code and the diffusion code of each traffic channel (SQ818 to SQ820). The information sent from the contents server, which is stored in the recording unit located in the base station apparatus, is repetitively delivered within a certain length of time. Hence, the mobile station 4 enables to receive the news information that has been already delivered. Herein, the mobile station 4 enables to receive the information of all the layers (SQ821 to SQ824). This is the method of performing the multicast delivery.

In turn, the description will be oriented to the process to be executed if the user request the information that has been already delivered.

Figure 15:
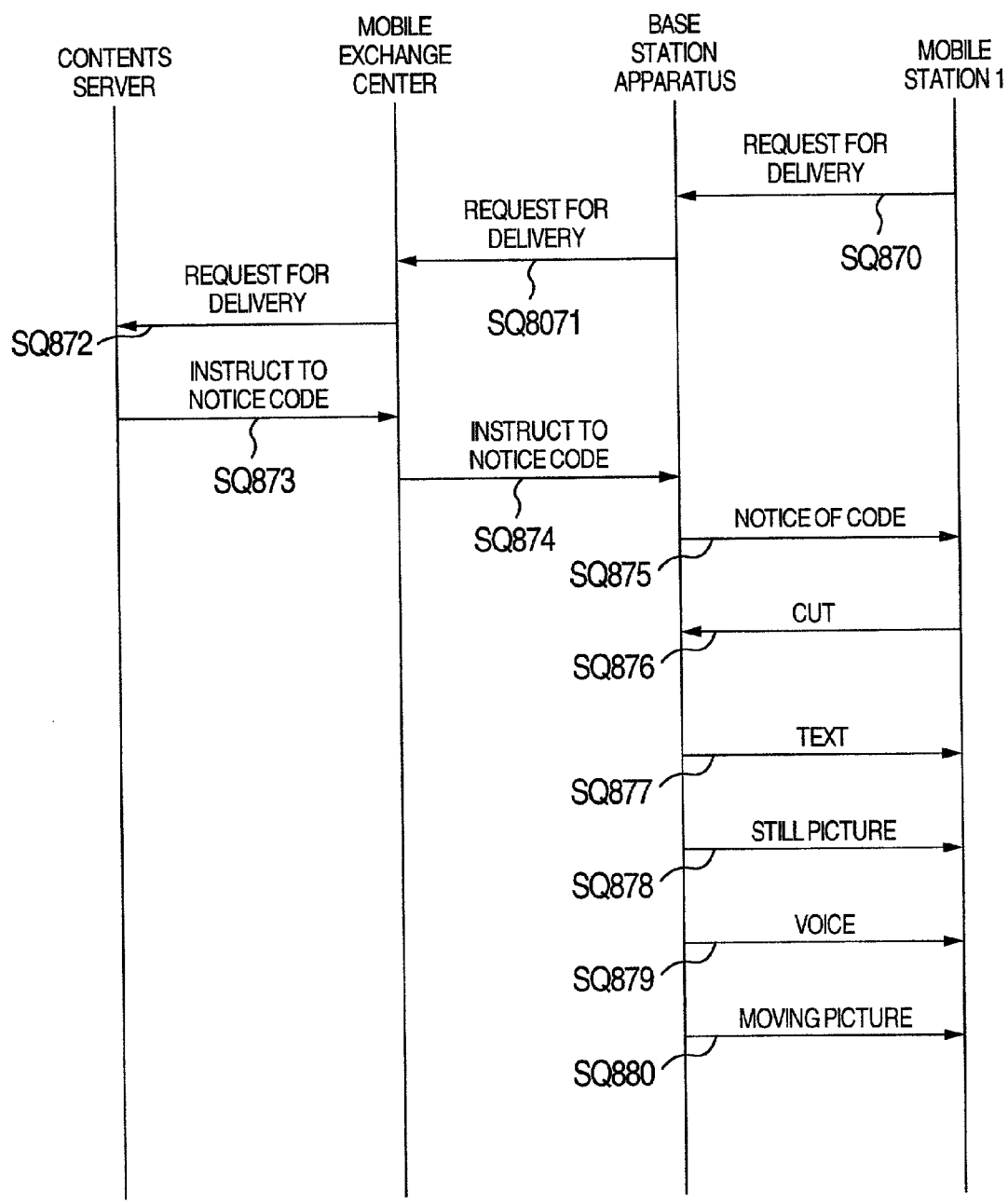
FIG. 15 is a view showing a sequence appearing in multicasting information (user-requesting type)

FIG. 15 is a sequence view showing a process to be executed in the case that the user requests the information that has been already delivered.

The information such as news and pictures is repetitively multicast from the base station apparatus to the mobile stations. The content of the information being delivered is not changed until it is updated or instructed to be changed by the contents server. Since the mobile station 1 does not know the code for decoding the information being delivered, the mobile station 1 operates to transmit the request for delivery to the base station apparatus by entering a keyword or a menu (SQ870). When the program menu or the keyword is entered, it is converted into a phone number or an ID having any digit and then is notified to the contents server. The base station apparatus operates to transmit the request for delivery to the contents server through the mobile exchange center (SQ871 to SQ872). The contents server having received this request for delivery operates to identify the program required by the user from the phone number or the ID. If it is determined that the information requested by the mobile station 1 has been delivered, the mobile station 1 operates to transmit an indication for noticing the code for de-scrambling or identifying the traffic channel to the base station apparatus (SQ873 to SQ874). The base station apparatus having received the indication operates to call the mobile station in response to the indication of the control unit located in the base station apparatus itself and then notify the mobile station 1 of the PN code and the diffusion code for decoding the information through the traffic channel (SQ875). The mobile station 1 operates to receive the PN code and the diffusion code, cut off the traffic channel to the base station apparatus, and decode the multicast information with the received codes (SQ876 to SQ880). The foregoing method makes it possible for the user to receive the repetitively delivered information from the next cycle.

In turn, the description will be oriented to the broadcast service.

Figure 16:
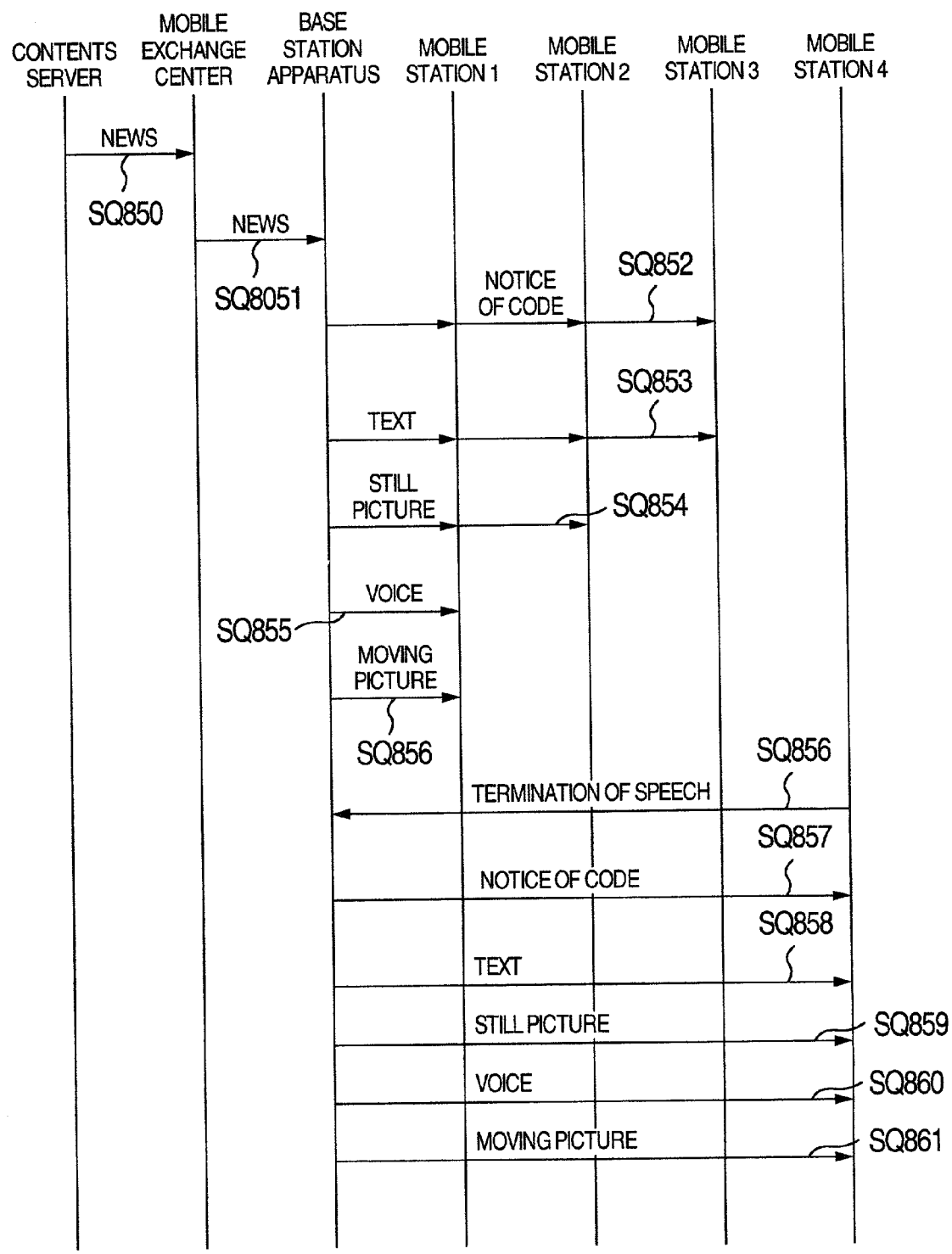
FIG. 16 is a view showing a sequence appearing in multicasting information.

FIG. 16 is a sequence view showing the process to be executed in the broadcast service.

The broadcast service means delivery of information to all mobile stations. Hence, it is different from the multicast service in that the base station does not need to call only the mobile stations joining in the service.

In FIG. 16, the contents server operates to transmit to the mobile exchange center the news to be delivered and the information for indicating the news should be broadcast (SQ850). Herein, it is assumed that the news information is layered into text, a still picture, voice and a moving picture by the contents server. After receiving these layers, the mobile exchange center operates to transmit them to all the base station apparatuses. Since the news information is a broadcast type delivery, the base station apparatus operates to notify all the mobile stations located in the area covered by each base station apparatus of the PN code and the diffusion code for de-scrambling and reverse diffusion (SQ852) through the use of the paging channel (SQ852). The ground on the use of the paging channel is that all mobile stations can read the paging channel. In the example shown in FIG. 16, the mobile station 4 is in speech.

The base station apparatus operates to allocate the layer contained in the news information to the corresponding traffic channel and transmit the layers scrambled and diffused with the PN code and the diffusion code notified to the mobile stations in advance (SQ853 to SQ856). In the broadcast time, the PN code and the diffusion code are repetitively delivered through the paging channel. Hence, when the speech is terminated (SQ865), the mobile station 4 operates to receive the PN code and the diffusion code notified through the paging channel (SQ857). The mobile station 4 having received the codes operates to receive the news having the text, the still picture, the voice and the moving picture being repetitively delivered from the base station apparatus within a certain length of time with the PN code and the diffusion code (SQ853 to SQ856).

In turn, the description will be oriented to the picture delivery service for providing variable receiving times, which is an exemplary application of the information delivery system according to the invention.

Figures 17A, 17B:
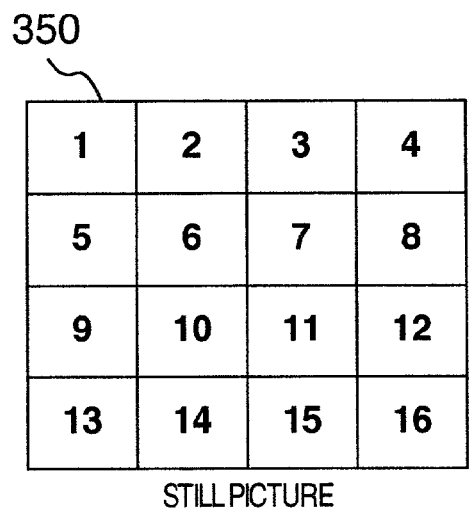
FIGS. 17A and 17B are views showing the method for bringing about a difference in a transmission time of a still picture.

FIG. 17A shows a layer arrangement of a still picture in an embodiment of the delivery information located in the information database 502.

The still picture 350 is composed of 16 pixels ranging from the first to the sixteenth pixels, each of which has position information and color information. FIG. 17B shows information of each layer. Inside of the information database 502, the layer 1 stores the first to the sixteenth pixels in proper sequence, which will be delivered in this sequence. The layer 2 stores the ninth to the sixteenth and the first to the eighth pixels in this sequence. The layer 3 stores the fifth to the sixteenth and the first to the fourth pixels in this sequence. The layer 4 stores the thirteenth to the sixteenth and the first to the twelfth pixels in this sequence. The layer 1 can be transmitted at a certain transmission power, the layer 2 can be transmitted at a half of the power, the layer 3 can be transmitted at a fourth of the power, and the layer 4 can be transmitted at an eighth of the power as shown in FIGS. 12A and 12B. The layer 1 transmitted at the largest power can be received by the mobile stations even in the bad wave circumstances, while the layer transmitted at the smaller power cannot be received unless the wave circumstances are excellent. That is, the mobile station that is receiving only the layer 1 needs a considerably long time because the first to the sixteenth pixels of the still picture 350 are received in this sequence. On the other hand, if all the layers ranging from the layer 1 to the layer 4 can be received at a time, since the mobile station can receive four pixels at a time, the receiving time of the still picture 350 is a fourth of the time taken in receiving only the layer 1. As described above, by delivering the layer informations in parallel and in synchronous to each other, since the mobile station located in the good wave circumstances needs a shorter receiving time than the mobile station located in the bad wave circumstances, the service can be differentiated according to the wave circumstances where the mobile station is located. In this example, each layer is serviced at the corresponding transmission power. As described above, each layer may be serviced at the corresponding data rate, coding coefficient or transmission time as shown in FIGS. 13B to 13D, for the purpose of implementing the differentiation of the receiving time.

The delivery to be executed by this method may apply to not only the still picture but the news delivery as shown in FIG. 3. For example, the sequence in which the text, the still picture, the voice and the moving picture are transmitted is changed according to each layer. In the layer 1, the text, the still picture, the voice and the moving picture are repetitively delivered from the contents server in this sequence. In the layer 2, the still picture, the voice, the moving picture and the text are repetitively delivered in this sequence. In the layer 3, the voice, the moving picture, the text and the still picture are repetitively delivered in this sequence. In the layer 4, the moving picture, the text, the still picture and the voice are repetitively delivered in this sequence. As described above, the differentiation of the service is made possible according to the wave circumstances where the mobile station is located.

Figure 18A:
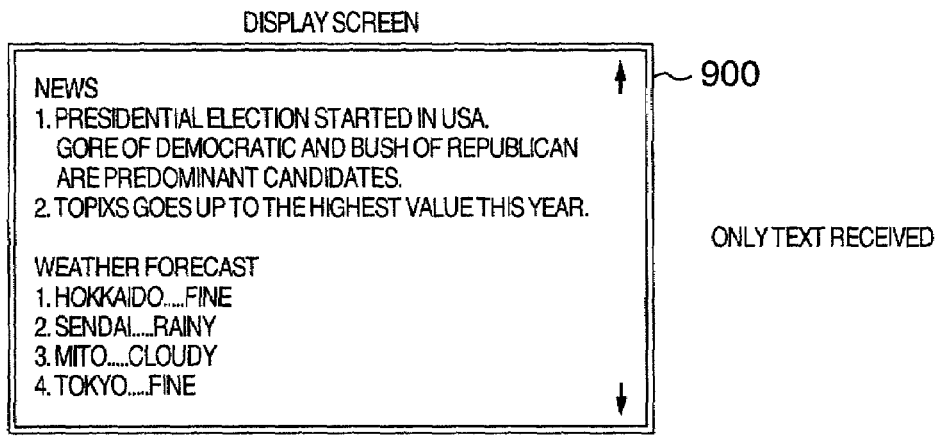
FIGS. 18A, 18B and 18C are views showing the output screens of the mobile station.
Figure 18B:
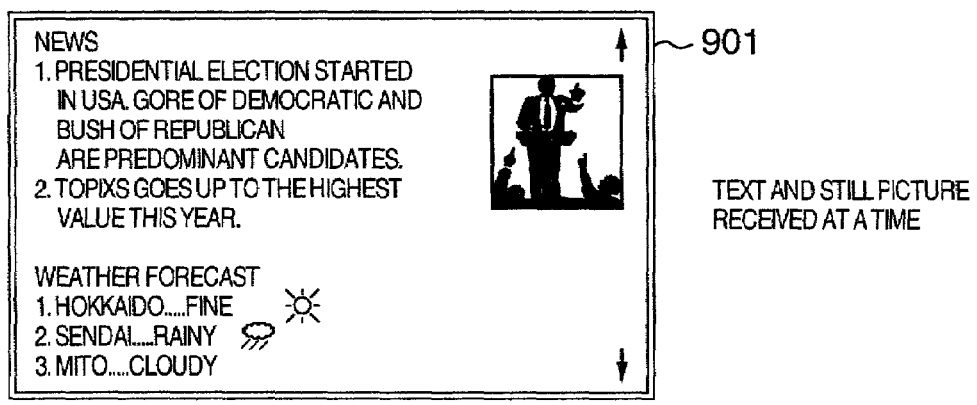
Figure 18C:
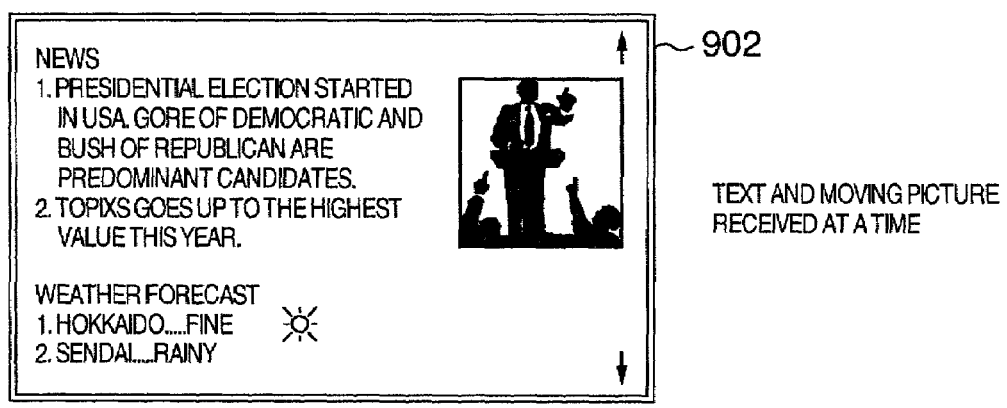

FIGS. 18A, 18B, and 18C show the output content on the display screen of the mobile station appearing in the case of using the information delivery system according to an embodiment of the present invention.

Herein, in the news delivery shown in FIG. 3, the output content of the mobile station for each layer is shown in FIG. 18. The mobile station has a function of storing the received layer informations in the recording unit, integrating them through the control unit, and outputting the integrated information from the output unit. FIG. 18A shows the output content appearing when the mobile station receives only the text information of the layer 1. In the news delivery, since the latest news of the day and the time to be delivered are composed of text, the text information is allocated to the layer 1 with the high significance so that it may be delivered to the mobile station located in the bad wave circumstances. The additional information used for aiding in understanding the content of the text, that is, the still picture is allocated to the layer 2. Hence, the mobile station located in such wave circumstances as allowing only the layers 1 and 2 to be received operates to display the output as shown in FIG. 18B. FIG. 18C shows the output content appearing when the mobile station receives all the layers. In FIGS. 18A, 18B and 18C, the voice and the moving picture are allocated to the layers 3 and 4, respectively. In this case, the voice represents the vocalized content of the text and the moving picture represents the status of the speech in the presidential election campaign. As is understood from these display screens, the content of the news can be grasped from only the text, while the news may be more easily grasped if the still picture and the moving picture are attached to the text. In addition to this kind of layering, it is possible to allocate the advertisement information composed of text and a still picture to the other layer rather than the layer 1 and then deliver the layers.

According to the foregoing embodiments, the information delivery system that enables to implement the multicast or the broadcast is arranged to provide the delivery service of the quality corresponding to the transmission speed even if the transmission speed at a radio interval between the mobile station and the base station apparatus is not constant and allows the mobile station to output the content of the received information according to the information amount onto the output unit so that the user can enjoy the service.

What is claimed is:

1. A base station apparatus for delivering multimedia information to a plurality of mobile stations through a radio channel connected therebetween in a CDMA (Code Division Multiple Access) system, comprising:
   a receive interface for receiving a frame having layered information components composing said multimedia information and a transmission priority of each of said layered information components;
   an allocating device for allocating the frame with a higher priority to a channel with better quality of communication, based on said transmission priority;
   a diffuser provided for each channel and for diffusing the frame allocated by said allocating device; and
   a transmitter for transmitting the frame diffused by said diffuser.

2. A base station apparatus as claimed in claim 1, further comprising:
   a diffusion code setter for setting a diffusion code for separating said channels to said diffuser; and
   a notifying device for notifying said plurality of mobile stations of the diffusion code for separating said channels set by said diffusion code setter and the relation information for indicating the correspondence between said diffusion code and said channel.

3. A base station apparatus as claimed in claim 1, further comprising:
   a transmission power adjuster for adjusting the transmission power of the channel to which said frame is allocated on the basis of said transmission priority contained in said frame.

4. A base station apparatus as claimed in claim 1, further comprising:
   a diffusion coefficient adjuster for adjusting a diffusion coefficient of said frame on the basis of said transmission priority contained in said frame.

5. A base station apparatus as claimed in claim 4, wherein said diffusion coefficient adjuster adjusts a diffusion coefficient by adjusting a data rate, a coding coefficient or a transmission time.

6. A base station apparatus as claimed in claim 2, wherein said notifying device operates to notify said plurality of mobile stations of said diffusion code and said relation information through a paging channel intended for noticing said diffusion code for separating the channels.

7. A base station apparatus as claimed in claim 2, further comprising:
   a traffic channel establishing device for establishing a traffic channel to a specific one of said mobile stations, said traffic channel being intended for noticing said diffusion code for separating the channels, and wherein
   said notifying device operates to notify said plurality of mobile stations of said diffusion code and said relation information through said traffic channel established by said traffic channel establishing device.

8. A mobile station for receiving multimedia information from a base station apparatus through a radio channel connected in a CDMA (Code Division Multiply Access) system, comprising:
   a receive interface for receiving a plurality of frames allocated to the channels respectively, said frames containing layered information components composing said multimedia information;
   a reverse diffuser provided in each channel and for picking up the frame allocated to said channel by reversely diffusing a plurality of frames received by said receive interface with a diffusion code for separating the channels notified by said base station apparatus;
   a determining unit provided in each channel and for determining whether or not the frame picked by said reverse diffuser meets the predetermined communication quality;
   a recomposing unit for recomposing said multimedia information from the frame determined to meet the communication quality by said determining unit; and
   an information output unit for outputting said multimedia information rearranged by said rearranging unit to an output unit.

9. A mobile station as claimed in claim 8, wherein the information outputted by said output unit can be recognized visually and acoustically.

10. A mobile station as claimed in claim 8, further comprising:
   a guide output unit for outputting guide information of each of said information components contained in the frame determined to meet the predetermined communication quality level by said determining unit.

11. A mobile station as claimed in claim 10, wherein said guide information contains tariff information about the using fees of said information components.

12. A mobile station as claimed in claim 10 or 11, wherein a control unit operates to recompose multimedia information from the frame containing said information components to be intended to be used by the user of said mobile station, based on said guide information outputted by said guide output unit.

13. A mobile station as claimed in claim 8, further comprising:
    a first measuring unit for measuring an S/N ratio of said frame on the basis of transmission priority contained in a frame header defined by said base station apparatus;
    a second measuring unit provided in each channel and for measuring a frame error rate of an electric signal diffused by a decoder; and
    wherein said determining unit operates to determine whether or not the frame error rate or the S/N ratio meets the predetermined communication quality level.

* * * * *